US005602402A

United States Patent [19]
Yasuda

[11] Patent Number: 5,602,402
[45] Date of Patent: Feb. 11, 1997

[54] RADIATION IMAGE READ-OUT METHOD AND APPARATUS

[75] Inventor: Hiroaki Yasuda, Kanagawa-ken, Japan

[73] Assignee: Fuji Photo Film Co., Ltd., Kanagawa, Japan

[21] Appl. No.: 513,187

[22] Filed: Aug. 9, 1995

[30] Foreign Application Priority Data

Oct. 14, 1994 [JP] Japan .................................. 6-249613
Nov. 24, 1994 [JP] Japan .................................. 6-289511
Nov. 24, 1994 [JP] Japan .................................. 6-289512

[51] Int. Cl.$^6$ ................................................. G01N 23/04
[52] U.S. Cl. ............................................ 250/587; 250/586
[58] Field of Search ............................ 250/587, 584–586

[56] References Cited

U.S. PATENT DOCUMENTS 4,346,295  8/1982  Tanaka et al. .
4,356,398  10/1982  Komaki et al. .
4,689,482  8/1987  Horikawa et al. ......................... 250/585
5,477,059  12/1995  Arakawa .................................... 250/587

FOREIGN PATENT DOCUMENTS 140045  6/1986  Japan ...................................... 250/587

Primary Examiner—Carolyn E. Fields
Attorney, Agent, or Firm—Sughrue, Mion, Zinn, Macpeak & Seas

[57] ABSTRACT

A stimulable phosphor sheet, on which a radiation image has been stored, is exposed to stimulating rays, which cause it to emit light in proportion to the amount of energy stored thereon during its exposure to radiation. The light, which is emitted from the front surface of the stimulable phosphor sheet, and the light, which is emitted from the back surface of the stimulable phosphor sheet, are detected respectively with two photoelectric read-out devices, and two image signals are thereby obtained. The two image signals are added to each other in a predetermined addition ratio. A change of the addition ratio with the passage of time is compensated for by detecting predetermined reference light with the two photoelectric read-out devices, two reference signals being thereby obtained, calculating a representative value of each of the two reference signals, two representative values being thereby obtained, and utilizing the ratio between the two representative values for the compensation for the change of the addition ratio.

26 Claims, 13 Drawing Sheets

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein two image signals are respectively detected from the front and back surfaces of a stimulable phosphor sheet, on which a radiation image has been stored, and the two image signals are then added to each other in a predetermined addition ratio, and wherein a change of the addition ratio with the passage of time is compensated for appropriately.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

For use in radiation image recording and reproducing systems, techniques for carrying out superposition processing on radiation images have heretofore been proposed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object be detected accurately in the radiation image. The extent to which such differences in the radiation energy absorption characteristics can be detected in a radiation image is referred to as the contrast detection performance or, simply, as the detection performance. A radiation image having better detection performance has better image quality and can serve as a more effective tool, in particularly, in the efficient and accurate diagnosis of an illness. Therefore, in order for the image quality to be improved, it is desirable that the detection performance of the radiation image be enhanced. Practically, the detection performance is adversely affected by various noises.

For example, in the aforesaid radiation image recording and reproducing systems using stimulable phosphor sheets, it has been found that the noises described below occur during the step of recording the radiation image on the stimulable phosphor sheet, and of reading out the radiation image therefrom.

Such noises include (1) A quantum noise of radiation produced by a radiation source.

(2) A noise due to nonuniformity in how a stimulable phosphor coated on the stimulable phosphor sheet is distributed, or how stimulable phosphor grains are distributed on the stimulable phosphor sheet.

(3) A noise of stimulating rays, which cause the stimulable phosphor sheet to emit light in proportion to the amount of energy stored thereon during its exposure to radiation.

(4) A noise of light, which is emitted by the stimulable phosphor sheet, guided and detected.

(5) An electric noise in the system for amplifying and processing an electric signal.

Superposition processing is carried out in order to reduce the aforesaid noises markedly, so that even small differences in the radiation energy absorption characteristics among structures of an object can be found accurately in a visible radiation image, which is reproduced finally (i.e. the detection performance of the radiation image can be improved markedly improved). Ordinary techniques and effects of the superposition processing are as described below.

Specifically, radiation images are recorded on a plurality of recording media, which overlap one upon another. A plurality of image signals are detected from the plurality of the recording media and then superposed one upon another (i.e., added to one another). In this manner, various noises described above can be reduced. Specifically, an image signal having a high signal-to-noise ratio can be obtained.

Also, it is possible to employ a technique, wherein two image signals are detected from the opposite surfaces of the stimulable phosphor sheet, and the image signal components of the two image signals are then added together, which image signal components represent corresponding picture elements on the front and back surfaces of the stimulable phosphor sheet. Such a technique is proposed in, for example, U.S. Pat. No. 4,346,295. In such cases, the image information, which has been recorded with the radiation absorbed by the portion of the stimulable phosphor layer located on the radiation incidence side, is primarily obtained from the surface of the stimulable phosphor sheet, which surface was located on the radiation incidence side when the stimulable phosphor sheet was exposed to the radiation during the image recording operation. Also, the image information, which has been recorded with the radiation absorbed by the portion of the stimulable phosphor layer located on the side opposite to the radiation incidence side, is primarily obtained from the surface of the stimulable phosphor sheet, which surface was located on the side opposite to the radiation incidence side when the stimulable phosphor sheet was exposed to the radiation during the image recording operation.

When two image signals detected from the opposite surfaces of the stimulable phosphor sheet are superposed one upon the other, a superposition image signal can be obtained which reflects a larger amount of image information. Specifically, an image signal having a higher signal-to-noise ratio (S/N) can be obtained.

In cases where the operation for detecting two image signals from the opposite surfaces of a stimulable phosphor sheet is carried out, and a visible image is reproduced from an addition signal, which has been obtained by adding the two image signals to each other, noise reduces in the visible image as a whole. However, the sharpness of the visible image also becomes low. Therefore, for example, in cases where an image region of a high spatial frequency is to be used and therefore is required to have a good image quality, signal processing should preferably be carried out by using only the image signal, which is detected from the front surface side of the stimulable phosphor sheet, such that the image may have good image quality and can serve as an effective tool in, particularly, the efficient and accurate diagnosis of an illness. In cases where an image region of a low spatial frequency is to be used and therefore is required to have a good image quality, it is not necessary for the region of a high spatial frequency to have high sharpness in the reproduced image, and noise in the image as a whole should be reduced such that the image may have good image quality and can serve as an effective tool in, particularly, the efficient and accurate diagnosis of an illness. Therefore, in such cases, the superposition processing described above may be carried out.

As described above, the spatial frequency of interest in the image to be used varies for different kinds of images. Therefore, if the superposition processing is merely carried out, the problem will occur in that appropriate addition processing cannot be carried out. Also, noise components vary for different doses of radiation irradiated to the stimulable phosphor sheet and for different kinds of the stimulable phosphor sheets. Therefore, the addition ratio, in which the two image signals are added to each other and which yields the highest signal-to-noise ratio, varies for different doses of radiation and different kinds of the stimulable phosphor sheets.

Accordingly, the applicant proposed a novel superposition processing method for a radiation image in U.S. Pat. No. 5,477,059. With the proposed method, in cases where an operation for detecting two image signals from the opposite surfaces of a stimulable phosphor sheet is carried out, and the two image signals are then added to each other, an addition ratio, in which the two image signals are added to each other, is changed in accordance with the kind of the stimulable phosphor sheet, the spatial frequency of interest in the radiation image, the conditions under which the radiation was irradiated, and the like. In this manner, a superposition image signal can be obtained such that an image, in which the signal-to-noise ratio at the spatial frequency of interest is highest, may be reproduced regardless of the kind of the image to be used, the dose of radiation irradiated to the stimulable phosphor sheet, or the like.

However, even if the optimum addition ratio yielding a reproduced visible image, in which the signal-to-noise ratio is highest, is obtained, the optimum addition ratio will often change with the passage of time due to a change in the read-out gain of each photoelectric read-out means, the output power of the stimulating rays, or the like. If the addition ratio thus changes, the signal-to-noise ratio of the reproduced visible image will become low. Therefore, a reproduced visible image cannot be obtained which has good image quality and can serve as an effective tool in, particularly, the efficient and accurate diagnosis of an illness.

SUMMARY OF THE INVENTION

The primary object of the present invention is to provide a radiation image read-out method, wherein an operation for detecting two image signals from the opposite surfaces of a stimulable phosphor sheet is carried out, and an optimum addition ratio, in which the two image signals are added to each other, is kept with a simple constitution.

Another object of the present invention is to provide a radiation image read-out method, wherein an operation for detecting two image signals from the opposite surfaces of a stimulable phosphor sheet is carried out, the two image signals are then added to each other in an addition ratio, and a change of the addition ratio with the passage of time is compensated for without any particular work being required and with a simple constitution.

The specific object of the present invention is to provide an apparatus for carrying out the radiation image read-out method.

The present invention provides a first radiation image read-out method comprising the steps of:
i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
iii) adding the two image signals to each other in a predetermined addition ratio, an addition image signal, which represents the radiation image, being thereby obtained, wherein the improvement comprises the steps of:
a) photoelectrically detecting predetermined reference light with the two photoelectric read-out means, two reference signals being thereby obtained,
b) calculating a representative value of each of the two reference signals, two representative values being thereby obtained,
c) calculating the ratio between the two representative values, and
d) compensating for a change of the addition ratio with the passage of time in accordance with the ratio between the two representative values.

The present invention also provides a first radiation image read-out apparatus comprising:
i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and
iii) a means for adding the two image signals to each other in a predetermined addition ratio, an addition image signal, which represents the radiation image, being thereby obtained, wherein the improvement comprises the provision of:
a) a reference signal detecting means for photoelectrically detecting predetermined reference light with the two photoelectric read-out means, two reference signals being thereby obtained,
b) a representative value calculating means for calculating a representative value of each of the two reference signals, two representative values being thereby obtained,
c) a ratio calculating means for calculating the ratio between the two representative values, and
d) a compensation means for compensating for a change of the addition ratio with the passage of time in accordance with the ratio between the two representative values.

In the first radiation image read-out method and apparatus in accordance with the present invention, the representative value may be any of values, which are representative of each of the reference signals. For example, the representative value may be the mean value of the values of the reference signal, which corresponds to the entire area of the image region or a portion of the image region. Alternatively, the representative value may be the median value of the values of the reference signal, which corresponds to the entire area of the image region or a portion of the image region. As another alternative, the representative value may be the peak value in the probability density function of the reference signal, which corresponds to the entire area of the image region or a portion of the image region.

Also, in the first radiation image read-out method and apparatus in accordance with the present invention, the two image signals may be obtained by photoelectrically detecting the light, which is emitted from the front surface of the stimulable phosphor sheet, and the light, which is emitted from the back surface of the stimulable phosphor sheet, respectively with the two photoelectric read-out means, in each of which the read-out gain has been set such that the ratio between the read-out gains of the two photoelectric read-out means may be equal to a predetermined value, and the compensation for a change of the addition ratio with the passage of time, which change is due to a change of the read-out gains after they have been set in the two photoelectric read-out means, may be carried out by correcting the read-out gain in each of the two photoelectric read-out means such that the ratio between the read-out gains of the two photoelectric read-out means may become equal to the predetermined value.

Further, in the first radiation image read-out method and apparatus in accordance with the present invention, the two image signals may be obtained by exposing the front surface of the stimulable phosphor sheet to the stimulating rays, which have been produced by one of two stimulating ray sources, and exposing the back surface of the stimulable phosphor sheet to the stimulating rays, which have been produced by the other stimulating ray source, and the compensation for a change of the addition ratio with the passage of time may be carried out by correcting the output power of each of the two stimulating ray sources.

Furthermore, in the first radiation image read-out method and apparatus in accordance with the present invention, the predetermined reference light may be the light emitted from the front surface and the back surface of a stimulable phosphor sheet, which has been uniformly exposed to radiation, when the stimulable phosphor sheet, which has been uniformly exposed to radiation, is exposed to the stimulating rays. Alternatively, the predetermined reference light may be the light produced by reference light sources. As another alternative, the predetermined reference light may be the fluorescence produced by the front surface and the back surface of a fluorescent substance when the fluorescent substance is exposed to the stimulating rays, the fluorescent substance being located at a portion of the stimulable phosphor sheet and producing the fluorescence, which is capable of being detected by the two photoelectric read-out means, when the fluorescent substance is exposed to the stimulating rays.

Also, the first radiation image read-out method and apparatus in accordance with the present invention may be modified such that it may be detected whether the ratio between the two representative values falls or does not fall within a predetermined range.

Further, the first radiation image read-out method and apparatus in accordance with the present invention may be modified such that the ratio between the two representative values may be compared with a reference value, and information representing the results of the comparison may be fed out.

The present invention further provides a second radiation image read-out method comprising the steps of:
 i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
 ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
 iii) adding the two image signals to each other in a predetermined addition ratio, an addition image signal, which represents the radiation image, being thereby obtained,
 wherein the improvement comprises the steps of:
  a) calculating a representative value of each of the two image signals, two representative values being thereby obtained,
  b) calculating the ratio between the two representative values,
  c) comparing the ratio between the two representative values with a reference value, and
  d) compensating for a change of the addition ratio with the passage of time in accordance with the results of the comparison.

The present invention also provides a second radiation image read-out apparatus comprising:
 i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
 ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and
 iii) a means for adding the two image signals to each other in a predetermined addition ratio, an addition image signal, which represents the radiation image, being thereby obtained,
 wherein the improvement comprises the provision of:
  a) a representative value calculating means for calculating a representative value of each of the two image signals, two representative values being thereby obtained,
  b) a ratio calculating means for calculating the ratio between the two representative values,
  c) a comparison means for comparing the ratio between the two representative values with a reference value, and
  d) a compensation means for compensating for a change of the addition ratio with the passage of time in accordance with the results of the comparison.

In the second radiation image read-out method and apparatus in accordance with the present invention, the representative value may be any of values, which are representative of each of the image signals. For example, the representative value may be the mean value of the values of the image signal, which corresponds to the entire area of the image region or a portion of the image region. Alternatively, the representative value may be the median value of the values of the image signal, which corresponds to the entire area of the image region or a portion of the image region. As another alternative, the representative value may be the peak value in the probability density function of the image signal, which corresponds to the entire area of the image region or a portion of the image region.

Also, in the second radiation image read-out method and apparatus in accordance with the present invention, the two image signals may be obtained by photoelectrically detecting the light, which is emitted from the front surface of the stimulable phosphor sheet, and the light, which is emitted from the back surface of the stimulable phosphor sheet, respectively with the two photoelectric read-out means, in each of which the read-out gain has been set such that the ratio between the read-out gains of the two photoelectric read-out means may be equal to a predetermined value, and the compensation for a change of the addition ratio with the passage of time, which change is due to a change of the read-out gains after they have been set in the two photoelectric read-out means, may be carried out by correcting the read-out gain in each of the two photoelectric read-out means such that the ratio between the read-out gains of the two photoelectric read-out means may become equal to the predetermined value.

Further, in the second radiation image read-out method and apparatus in accordance with the present invention, the two image signals may be obtained by exposing the front surface of the stimulable phosphor sheet to the stimulating rays, which have been produced by one of two stimulating ray sources, and exposing the back surface of the stimulable phosphor sheet to the stimulating rays, which have been produced by the other stimulating ray source, and the compensation for a change of the addition ratio with the passage of time may be carried out by correcting the output power of each of the two stimulating ray sources.

Furthermore, the second radiation image read-out method and apparatus in accordance with the present invention may be modified such that it may be detected whether the ratio between the two representative values falls or does not fall within a predetermined range.

Also, the second radiation image read-out method and apparatus in accordance with the present invention may be modified such that the information representing the results of the comparison may be merely fed out.

If the read-out gain of a photoelectric read-out means, the output power of a stimulating ray source, or the like, does not change, the actual addition ratio in which two image signals are added to each other will not change from the originally set ratio. However, for reasons of the properties of the photoelectric read-out means, the stimulating ray source, or the like, the read-out gain of the photoelectric read-out means, the output power of the stimulating ray source, or the like, changes with the passage of time. As a result, the actual addition ratio in which two image signals are added to each other shifts from the predetermined value, which has originally been set, with the passage of time. Therefore, the actual addition ratio becomes different from the optimum addition ratio for the image signals to be added to each other. The first radiation image read-out method and apparatus and the second radiation image read-out method and apparatus in accordance with the present invention are based on such findings.

Specifically, with the first radiation image read-out method and apparatus in accordance with the present invention, wherein an operation for detecting two image signals from the opposite surfaces of a stimulable phosphor sheet is carried out, reference light for use in determining the addition ratio is photoelectrically detected by the two photoelectric read-out means, and two reference signals are thereby obtained. A representative value, such as the mean value or the median value, of each of the two reference signals is calculated, and two representative values are thereby obtained. The ratio between the two representative values is then calculated. A change of the addition ratio with the passage of time is then compensated for in accordance with the ratio between the two representative values. Therefore, even if the actual addition ratio changes with the passage of time, the change of the actual addition ratio can be compensated for, and the optimum addition ratio for the two image signals to be added to each other can be kept with a simple constitution and without any particular means being used.

It is often carried out that the ratio between the read-out gains of the two photoelectric read-out means is set at a predetermined value, and the two image signals are detected with the two photoelectric read-out means. However, the read-out gains of the two photoelectric—read-out means change with the passage of time. If the read-out gains of the two photoelectric read-out means change with the passage of time, the actual addition ratio will also change. In such cases, the compensation for the change of the addition ratio with the passage of time can be carried out by correcting the read-out gain in each of the two photoelectric read-out means such that the ratio between the read-out gains of the two photoelectric read-out means may become equal to the predetermined value, which has been set originally. In this manner, the optimum addition ratio for the two image signals to be added to each other can be kept with a simple constitution.

Also, in cases where the opposite surfaces of the stimulable phosphor sheet are respectively exposed to the stimulating rays, and the actual addition ratio changes, if the amount of the emitted light impinging upon each photoelectric read-out means can be changed in accordance with the degree of the change of the addition ratio, the addition ratio for the two image signals to be added to each other can be corrected. With the modification of the first radiation image read-out method and apparatus in accordance with the present invention, wherein the operation for detecting two image signals from the opposite surfaces of a stimulable phosphor sheet is carried out by locating two stimulating ray sources respectively on the opposite surface sides of the stimulable phosphor sheet and irradiating the stimulating rays to the opposite surfaces of the stimulable phosphor sheet, the output power of each of the two stimulating ray sources is corrected in accordance with the ratio between the representative values of the reference signals such that the ratio may become equal to a predetermined value. Therefore, even if the actual addition ratio changes with the passage of time, the output power of each of the two stimulating ray sources can be corrected in accordance with the degree of the change of the addition ratio, and the amount of the light emitted by the stimulable phosphor sheet can thereby be changed. In this manner, the optimum addition ratio for the two image signals to be added to each other can be kept with a simple constitution.

Specifically, as the reference light, it is possible to employ the light emitted from the front surface and the back surface of a stimulable phosphor sheet, which has been uniformly exposed to radiation, when the stimulable phosphor sheet, which has been uniformly exposed to radiation, is exposed to the stimulating rays. The light emitted from the front surface and the back surface of the stimulable phosphor sheet may be detected photoelectrically, and the two reference signals may thereby be obtained. Thereafter, a change of the addition ratio with the passage of time may be compensated for in accordance with the reference signals. In this manner, the change of the addition ratio, in which two image signals are to be added to each other, with the passage of time can be compensated for. The factor affecting the optimum addition ratio for the two image signals to be added to each other is not the absolute values of the image signals, but is the ratio between the two image signals. Therefore, in cases where the two reference signals are respectively obtained from the front and back surfaces of the stimulable phosphor sheet, which has been uniformly exposed to radiation, the ratio between the two reference signals can be calculated easily without the values of the read-out gains of the two photoelectric read-out means, the output power of the stimulating ray source, or the like, being calculated.

Further, a fluorescent substance, which produces the fluorescence capable of being detected by the two photoelectric read-out means when the fluorescent substance is exposed to the stimulating rays, may be located at a portion of the stimulable phosphor sheet, from which the two image signals are to be detected. The fluorescence, which serves as the reference light and is produced by the front surface and the back surface of the fluorescent substance when the fluorescent substance is exposed to the stimulating rays, may be photoelectrically detected from the front and back surfaces of the fluorescent substance, and the two reference signals may thereby be obtained. In cases where the fluorescent substance is located at the leading end of the stimulable phosphor sheet, during the radiation image read-out operation, the reference signals are first obtained from the fluorescent substance, and thereafter the image signals representing the radiation image are obtained. Therefore, the compensation for the change of the addition ratio, in which the two image signals are to be added to each other, can be immediately carried out in accordance with the reference signals, and thereafter the two image signals representing the radiation image can be obtained and added to each other. Accordingly, the results of the compensation for the change of the addition ratio can be immediately applied to the image signals detected from the stimulable phosphor sheet, from which the reference signals have been obtained.

With the modification of the first radiation image read-out method and apparatus in accordance with the present invention, wherein it is detected whether the ratio between the two representatives values of the two reference signals falls or does not fall within a predetermined range, a judgment can be made from the results of the detection as to whether the compensation for a change of the addition ratio with the passage of time is to be or is not to be carried out. Therefore, without any particular work being carried out, it is possible to judge whether the addition ratio is or is not correct.

With the modification of the first radiation image read-out method and apparatus in accordance with the present invention, wherein the ratio between the two representative values of the two reference signals is compared with a reference value, and information representing the results of the comparison is merely fed out, a judgment can be made from the results of the comparison as to whether the compensation for a change of the addition ratio with the passage of time is to be or is not to be carried out, or as to whether the addition ratio has or has not changed. Therefore, necessary measures, such as issuance of an alarm, can be taken.

With the second radiation image read-out method and apparatus in accordance with the present invention, wherein an operation for detecting two image signals from the opposite surfaces of a stimulable phosphor sheet is carried out, a representative value of each of the two image signals is calculated, and two representative values are thereby obtained. The ratio between the two representative values is then calculated and compared with a reference value. A change of the addition ratio with the passage of time is then compensated for in accordance with the results of the comparison. Therefore, even if the actual addition ratio, in which the two image signals are to be added to each other, changes with the passage of time, the change of the actual addition ratio can be compensated for, and the optimum addition ratio for the two image signals to be added to each other can be kept with a simple constitution and without any particular work being required.

As described above, in cases where the ratio between the read-out gains of the two photoelectric read-out means is set at a predetermined value, and the two image signals are detected with the two photoelectric read-out means, the actual addition ratio will change due to changes of the read-out gains of the two photoelectric read-out means with the passage of time. In such cases, the compensation for the change of the addition ratio with the passage of time can be carried out by correcting the—read-out gain in each of the two photoelectric read-out means such that the ratio between the read-out gains of the two photoelectric read-out means may become equal to the predetermined value, which has been set originally. In this manner, the optimum addition ratio for the two image signals to be added to each other can be kept with a simple constitution and without any particular work being required.

Also, as described above, in cases where the actual addition ratio changes, if the amount of the emitted light impinging upon each photoelectric read-out means can be changed in accordance with the degree of the change of the addition ratio, the addition ratio for the two image signals to be added to each other can be corrected. With the modification of the second radiation image read-out method and apparatus in accordance with the present invention, wherein the operation for detecting two image signals from the opposite surfaces of a stimulable phosphor sheet is carried out by locating two stimulating ray sources respectively on the opposite surface sides of the stimulable phosphor sheet and irradiating the stimulating rays to the opposite surfaces of the stimulable phosphor sheet, the output power of each of the two stimulating ray sources is corrected in accordance with the ratio between the representative values of the image signals. In this manner, the change of the addition ratio with the passage of time can be compensated for. Therefore, even if the read-out gain of each photoelectric read-out means changes with the passage of time, the output power of each of the two stimulating ray sources can be corrected in accordance with the degree of the change of the read-out gain, and the amount of the light emitted by the stimulable phosphor sheet can thereby be changed. Accordingly, the optimum addition ratio for the two image signals to be added to each other can be kept with a simple constitution and without any particular means being used.

With the modification of the second radiation image read-out method and apparatus in accordance with the present invention, wherein it is detected whether the ratio between the two representative values of the two image signals falls or does not fall within a predetermined range, a judgment can be made from the results of the detection as to whether the compensation for a change of the addition ratio with the passage of time is to be or is not to be carried out. Therefore, without any particular work being carried out, it is possible to judge whether the addition ratio is or is not correct.

With the modification of the second radiation image read-out method and apparatus in accordance with the present invention, wherein the ratio between the two representative values of the two image signals is compared with a reference value, and information representing the results of the comparison is merely fed out, a judgment can be made from the results of the comparison as to whether the compensation for a change of the addition ratio with the passage of time is to be or is not to be carried out, or as to whether the addition ratio has or has not changed. Therefore, necessary measures, such as issuance of an alarm, can be taken.

DESCRIPTION OF THE PREFERRED EMBODIMENTS

The present invention will hereinbelow be described in further detail with reference to the accompanying drawings.

Figure 1:
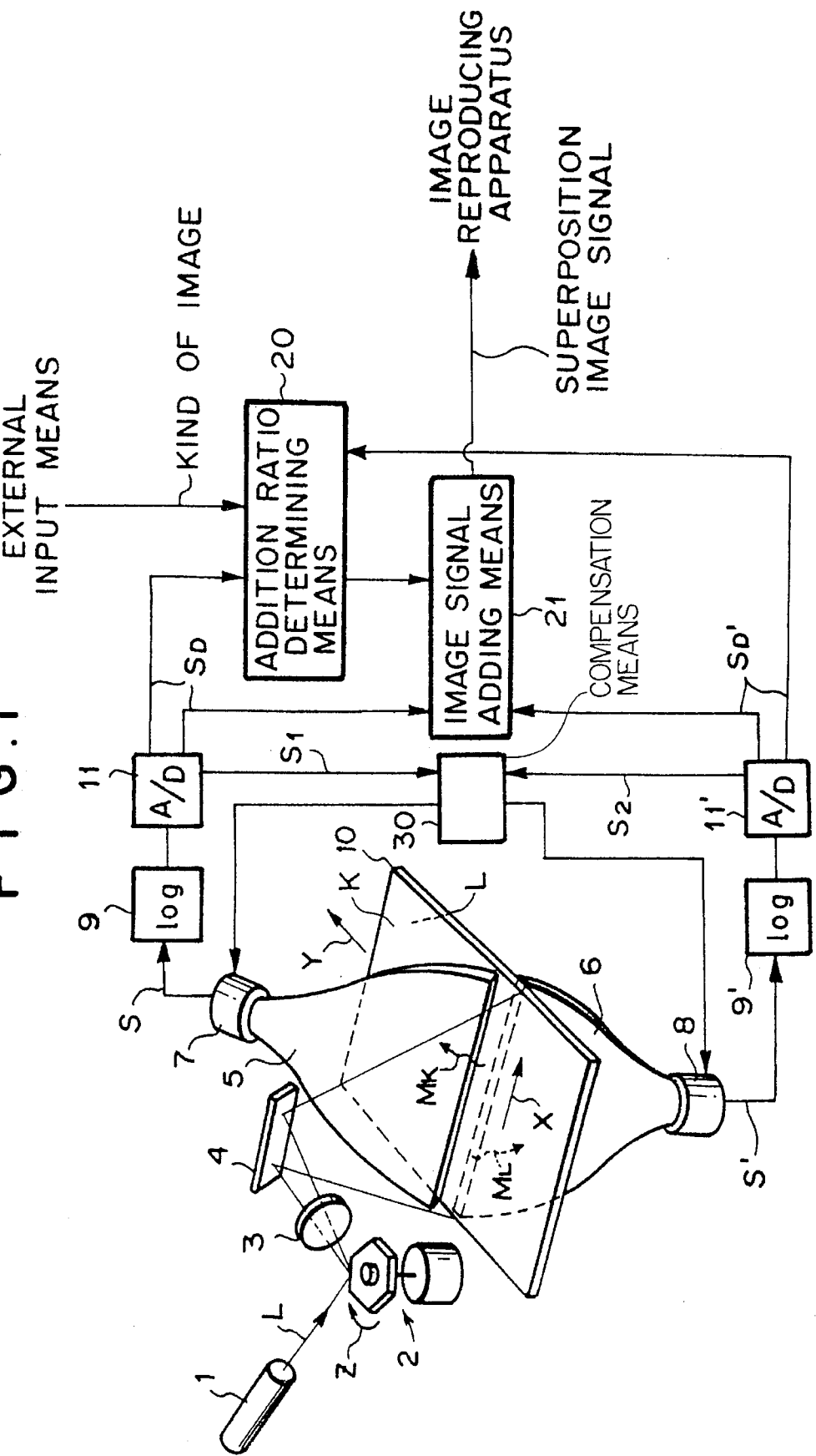
FIG. 1 is a block diagram showing a first embodiment of the radiation image read-out apparatus in accordance with the present invention.

FIG. 1 is a block diagram showing a first embodiment of the radiation image read-out apparatus in accordance with the present invention. As illustrated in FIG. 1, the radiation image read-out apparatus comprises a laser beam source 1, which produces a laser beam L serving as the stimulating rays. The radiation image read-out apparatus also comprises a rotating polygon mirror 2, an fθ lens 3, and a mirror 4, which cause the laser beam L having been produced by the laser beam source 1 to scan the front surface K of a stimulable phosphor sheet 10 in the main scanning direction indicated by the arrow X. When the stimulable phosphor sheet 10 is scanned with the laser beam L in the main scanning direction indicated by the arrow X, the scanned portion of the stimulable phosphor sheet 10 emits light M in proportion to the amount of energy stored thereon during its exposure to radiation. The radiation image read-out apparatus further comprises a first light guide member 5, which is located at a position for guiding the emitted light M on the side of the front surface K of the stimulable phosphor sheet 10, and a second light guide member 6, which is located at a position for guiding the emitted light M on the side of the back surface L of the stimulable phosphor sheet 10. The radiation image read-out apparatus still further comprises a first photomultiplier 7 and a second photomultiplier 8 for photoelectrically converting the emitted light M, which has been guided by the light guide members 5 and 6, and thereby obtaining a first image signal S and a second image signal S'. The radiation image read-out apparatus also comprises a first logarithmic amplifier 9 and a second logarithmic amplifier 9' for respectively carrying out logarithmic amplification of the obtained first image signal S and the obtained second image signal S'. The radiation image read-out apparatus further comprises a first analog-to-digital converter 11 and a second analog-to-digital converter 11' for respectively converting the first image signal S and the second image signal S', which have been amplified logarithmically, into a first digital image signal $S_D$ and a second digital image signal $S_D'$. The radiation image read-out apparatus still further comprises an addition ratio determining means 20 for calculating the addition ratio, in which the two image signals $S_D$ and $S_D'$ are to be added to each other, in accordance with the two image signals $S_D$ and $S_D'$, and/or the kind of the radiation image specified from an external input means, and/or other factors. The radiation image read-out apparatus also comprises an image signal adding means 21 for adding the image signal components of the two image signals $S_D$ and $S_D'$ to each other, which image signal components represent corresponding picture elements on the front surface K and the back surface L of the stimulable phosphor sheet 10. The radiation image read-out apparatus further comprises a compensation means 30 for correcting the read-out gains of the first photomultiplier 7 and the second photomultiplier 8.

In the first photomultiplier 7 and the second photomultiplier 8, the read-out gains have been initially set at certain values. As a result, the ratio between the read-out gains of the first photomultiplier 7 and the second photomultiplier 8 is set at a predetermined value.

How this embodiment operates will be described hereinbelow.

The laser beam L, which has been produced by the laser beam source 1, impinges upon the rotating polygon mirror 2, which is rotating in the direction indicated by the arrow Z. The laser beam L is reflected by the rotating polygon mirror 2. The laser beam L is then condensed by the fθ lens 3 and reflected by the mirror 5. In this manner, the laser beam L scans the surface of the stimulable phosphor sheet 10, on which the radiation image has been stored, in the main scanning direction indicated by the arrow X. At the same time, the stimulable phosphor sheet 10 is conveyed by a sub-scanning means (not shown) in the sub-scanning direction indicated by the arrow Y.

When the stimulable phosphor sheet 10 is exposed to the laser beam L, the exposed portion of the stimulable phosphor sheet 10 emits the light M in proportion to the amount of energy stored thereon during its exposure to radiation. The emitted light M is radiated from both the front surface K, upon which the laser beam L is impinges, and the back surface L, which is opposite to the laser beam incidence surface. The emitted light $M_K$, which has been radiated from the front surface K of the stimulable phosphor sheet 10, is guided by the first light guide member 5, which is located on the side of the front surface K. The emitted light $M_K$ is then photoelectrically converted by the first photomultiplier 7, and the first image signal S is thereby obtained. The first image signal S is then logarithmically amplified by the first logarithmic amplifier 9 and converted by the first analog-to-digital converter 11 into the first digital image signal $S_D$.

The emitted light $M_L$, which has been radiated from the back surface L of the stimulable phosphor sheet 10, is guided by the second light guide member 6, which is located on the side of the back surface L. The emitted light $M_L$ is then photoelectrically converted by the second photomultiplier 8, and the second image signal S' is thereby obtained. The second image signal S' is then logarithmically amplified by the second logarithmic amplifier 9' and converted by the second analog-to-digital converter 11' into the second digital image signal $S_D'$.

A visible image reproduced from the image information carried by the emitted light $M_K$ radiated from the front surface K of the stimulable phosphor sheet 10, upon which the laser beam L impinges, has the characteristics such that it has a higher sharpness and contains more noise than a visible image reproduced from the image information carried by the emitted light $M_L$ radiated from the back surface K of the stimulable phosphor sheet 10. Also, in cases where the amount of the emitted light M is large, i.e. in cases where the dose of radiation irradiated to the stimulable phosphor sheet 10 was large, an image having a high sharpness is obtained. In cases where the amount of the emitted light M is small, i.e. in cases where the dose of radiation irradiated to the stimulable phosphor sheet 10 was small, an image containing little noise is obtained. Therefore, in cases where the spatial frequency of the radiation image to be reproduced and used is high and the radiation image to be used is required to have a high sharpness, the image information obtained from the front surface K should primarily be utilized. However, in such cases, the image quality of the image and its capability of serving as an effective tool in, particularly, the efficient and accurate diagnosis of an illness are adversely affected by noise. Therefore, in cases where a slight decrease in the image sharpness is allowable, noise is to be reduced, and the image quality of the image and its capability of serving as an effective tool in, particularly, the efficient and accurate diagnosis of an illness are to be kept good, the image information obtained from the back surface L should primarily be utilized.

With this embodiment of the radiation image read-out apparatus in accordance with the present invention, the first digital image signal $S_D$, which has been obtained from the front surface K of the stimulable phosphor sheet 10, and the second digital image signal $S_D'$, which has been obtained from the back surface L of the stimulable phosphor sheet 10, are fed into the addition ratio determining means 20. In this manner, the amount of the emitted light $M_K$ radiated from the front surface K and the amount of the emitted light $M_L$ radiated from the back surface L are always monitored. Also, the addition ratio determining means 20 is connected to the external input means, which may be constituted of a keyboard, or the like. Items, such as the kind of the image, the spatial frequency of interest in the image to be used, the items affecting noise, e.g. the image region to be used, the kind of the stimulable phosphor sheet 10, and the like, are inputted from the external input means.

In accordance with the amounts of the emitted light $M_K$ and the emitted light $M_L$, which have been received from the first analog-to-digital converter 11 and the second analog-to-digital converter 11', and the items inputted from the external input means, the addition ratio determining means 20 determines the addition ratio, in which the first digital image signal $S_D$ and the second digital image signal $S_D'$ are to be added to each other. For this purpose, a predetermined function based on these items is utilized. A signal representing the determined addition ratio is fed from the addition ratio determining means 20 into the image signal adding means 21.

The image signal adding means 21 weights the first digital image signal $S_D$ and the second digital image signal $S_D'$ in accordance with the addition ratio determined by the addition ratio determining means 20. The image signal adding means 21 then adds the image signal components of the two image signals $S_D$ and $S_D'$ to each other, which image signal components represent corresponding picture elements on the front surface K and the back surface L of the stimulable phosphor sheet 10. A superposition digital image signal, which has been obtained from the addition, is fed into an external image reproducing apparatus, which reproduces a superposition radiation image.

In this manner, a superposition radiation image can be obtained such that the signal-to-noise ratio at the spatial frequency of interest in the image may be highest.

The function for the determination of the addition ratio by the addition ratio determining means 20 may be set such that, for example, regardless of the items inputted from the external input means, the addition ratio of the first digital image signal $S_D$ may be higher than the addition ratio of the second digital image signal $S_D'$ when the amount of the emitted light M is large, and such that the addition ratio of the first digital image signal $S_D$ may be lower than the addition ratio of the second digital image signal $S_D'$ when the amount of the emitted light M is small. In this manner, an image having a high sharpness can be obtained when the amount of the emitted light M is large. Also, an image containing little noise can be obtained when the amount of the emitted light M is small.

Alternatively, the function for the determination of the addition ratio by the addition ratio determining means 20 may be set in accordance with only the spatial frequency of the image to be used and regardless of the amount of the emitted light M. Specifically, in cases where the image to be used has a fine structure, the addition ratio of the first digital image signal $S_D$ is set to be higher than the addition ratio of the second digital image signal $S_D'$ such that the sharpness of the image may be kept high. Also, in cases where the image to be used has a simple structure, the addition ratio of the second digital image signal $S_D'$ is set to be comparatively high such that noise can be reduced. In this manner, the addition ratio may be selected such that the signal-to-noise ratio at the spatial frequency of interest in the image to be used may become highest.

Figure 2:
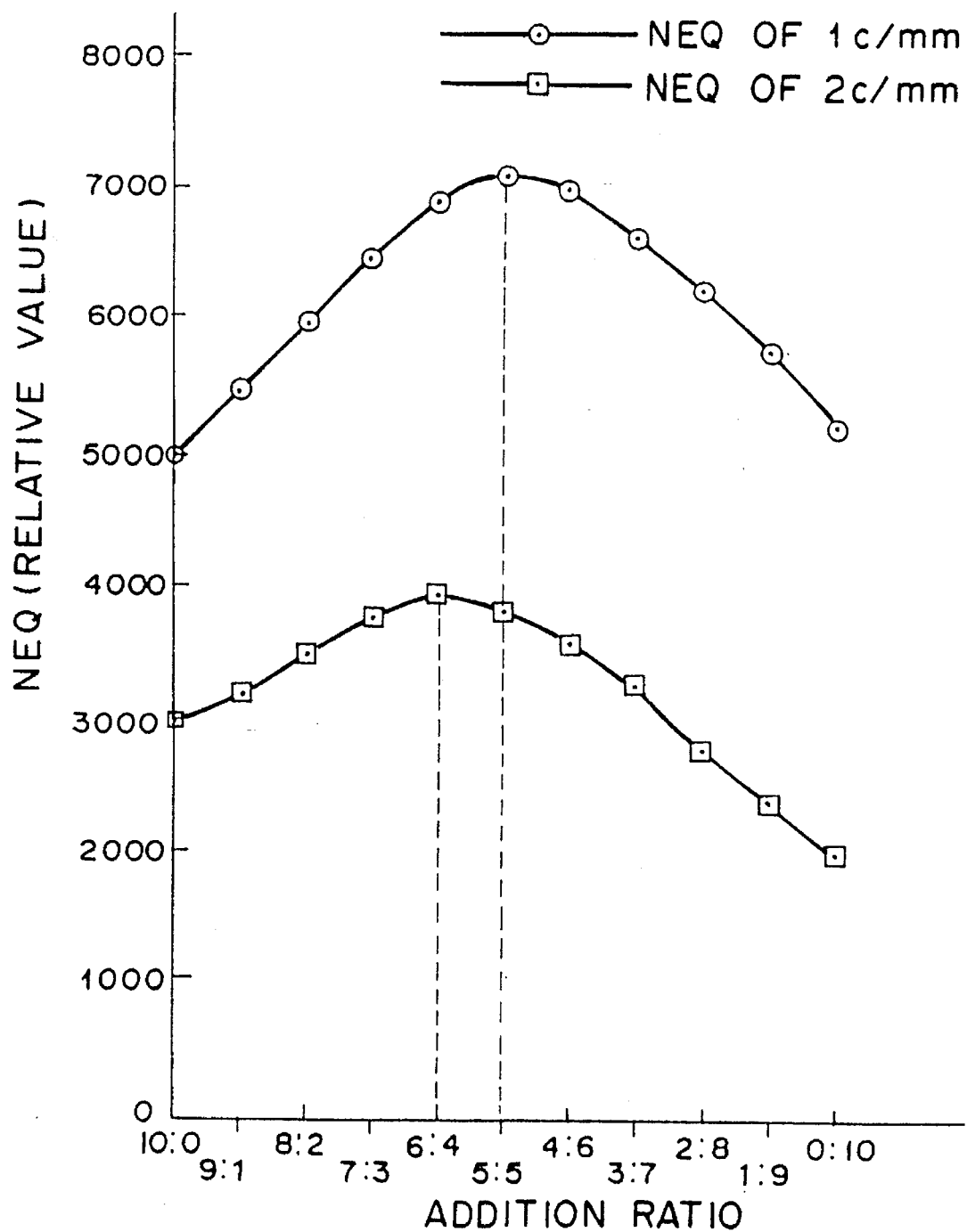
FIG. 2 is a graph showing the results of comparison of image sharpness in accordance with addition ratios.

FIG. 2 shows how the NEQ values (plotted on the vertical axis; relative value) at spatial frequencies of interest (1 c/mm and 2 c/mm) in the image to be used change when image signals are independently detected from the two surfaces of the stimulable phosphor sheet 10, on which a radiation image has been stored with a radiation dose of 0.1 mR, and the addition ratio (plotted on the horizontal axis) for the two image signals is changed at intervals of 10% between 10:0 (i.e., front surface 10:back surface 0) and 0:10 (i.e., front surface 0:back surface 10). The NEQ (noise equivalent quanta) is an index proportional to $(S/N)^2$.

From the results shown in FIG. 2, it has been found that the addition ratio associated with the maximum NEQ varies in accordance with the spatial frequency of interest in the image to be used (NEQ).

As described above, with this embodiment of the radiation image read-out apparatus in accordance with the present invention, the image signal, which has been detected from the front surface K of the stimulable phosphor sheet 10, and the image signal, which has been detected from the back surface L of the stimulable phosphor sheet 10, can be added to each other in a variable ratio by the image signal adding means 21. In this manner, the signal-to-noise ratio at the spatial frequency of interest in the reproduced image can be kept highest.

In cases where the addition ratio, in which the image signals $S_D$ and $S_D'$ obtained from the front and back surfaces of the stimulable phosphor sheet 10 are to be added to each other, is determined appropriately in the manner described above, a reproduced visible image having a high signal-to-noise ratio can be obtained. However, it may occur that the read-out gains of the photomultipliers 7 and 8 change with the passage of time. If the read-out gains of the photomultipliers 7 and 8 change, the ratio between the read-out gains of the photomultipliers 7 and 8 will shift from the predetermined value, which has been set initially. As a result, the addition ratio, which has been determined by the addition ratio determining means 20, will become different from the optimum addition ratio for the image signals $S_D$ and $S_D'$ to be added to each other. Specifically, in cases where the optimum addition ratio for the image signals $S_D$ and $S_D'$ is 1:1, if the read-out gain of the photomultiplier 8 located on the back surface side of the stimulable phosphor sheet 10 has decreased by 10% with the passage of time, the actual addition ratio becomes equal to 1:0.9 and thus becomes different from the optimum addition ratio.

Accordingly, in the compensation means 30, the read-out gains of the photomultipliers 7 and 8 are corrected each time a predetermined period has elapsed, and the optimum addition ratio is thereby kept. How processing is carried out by the compensation means 30 will be described hereinbelow.

A stimulable phosphor sheet 10, which has been uniformly exposed to radiation, is exposed to the laser beam, which has been produced by the laser beam source 1. In this manner, the reference image, which represents the uniform radiation image, is read out from the front and back surfaces of the stimulable phosphor sheet 10. The light emitted by the stimulable phosphor sheet 10, which light carries the image information of the reference image, is photoelectrically detected by the photomultipliers 7 and 8, and signals representing the reference image are thereby obtained. Thereafter, the signals representing the reference image are logarithmically amplified by the logarithmic amplifiers 9 and 9' and converted by the analog-to-digital converters 11 and 11' into reference signals $S_1$ and $S_2$.

Figure 3:
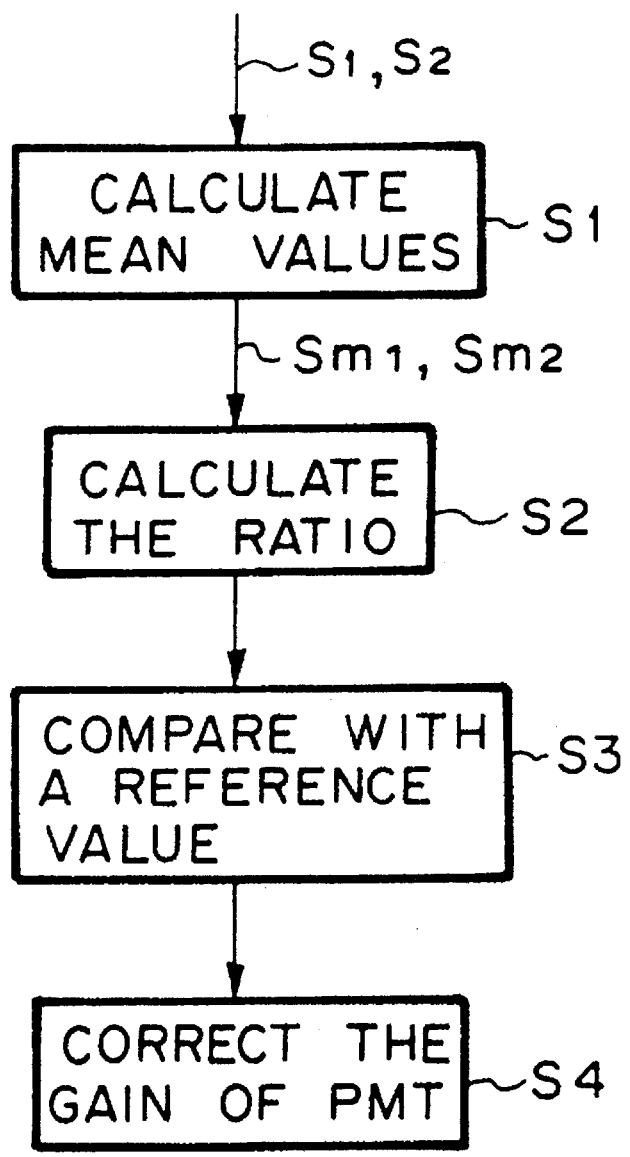
FIG. 3 is a flow chart showing how a read-out gain is corrected.

The reference signals $S_1$ and $S_2$ are fed into the compensation means 30 and subjected to the processing shown in FIG. 3.

With reference to FIG. 3, in a step S1, the mean value $S_{m1}$ of the values of the reference signal $S_1$, which corresponds to the entire area of the image region, is calculated. Also, the mean value $S_{m2}$ of the values of the reference signal $S_2$, which corresponds to the entire area of the image region, is calculated. Thereafter, in a step S2, the ratio $S_{m1}:S_{m2}$ between the mean values $S_{m1}$ and $S_{m2}$ is calculated. In a step S3, the calculated ratio and the reference value, i.e. the initially set value of the ratio between the read-out gains, are compared with each other. In this embodiment, the reference value is set to be 1:1. In a step 4, in cases where the calculated ratio $S_{m1}:S_{m2}$ is 1:0.9 and is thus different from the reference value, the read-out gains of the photomultipliers (PMT's) 7 and 8 are corrected. Specifically, in this embodiment, because the mean value $S_{m2}$ of the values of the reference signal $S_2$, which has been obtained from the back surface of the stimulable phosphor sheet 10, has decreased by 10%, the compensation means 30 increases the high voltage, which is applied to the photomultiplier 8 located on the back surface side of the stimulable phosphor sheet 10. In this manner, the compensation means 30 increases the read-out gain of the photomultiplier 8 by 10% such that the ratio $S_{m1}:S_{m2}$ may become equal to 1:1.

In this embodiment, the compensation means 30 corrects the read-out gains of the photomultipliers 7 and 8 in accordance with the ratio $S_{m1}:S_{m2}$ between the mean values of the reference signals $S_1$ and $S_2$ such that the ratio $S_{m1}:S_{m2}$ may become equal to the predetermined value. For example, in cases where the calculated ratio $S_{m1}:S_{m2}$ is 0.9:0.95, the read-out gain is corrected by taking the photomultiplier 7 or the photomultiplier 8, whichever has a higher read-out gain, as reference. Specifically, one of the important factors in carrying out the addition of the image signals $S_D$ and $S_D'$ by changing the addition ratio is not the absolute amount of change of the read-out gain, but is the ratio between the two read-out gains. Therefore, in cases where the calculated ratio $S_{m1}:S_{m2}$ is 0.9:0.95 and the reference value is 1:1, the compensation means 30 increases the read-out gain of the photomultiplier 7, which is located on the front surface side of the stimulable phosphor sheet 10, by 5% and thus makes a correction such that the ratio $S_{m1}:S_{m2}$ may become equal to 0.95:0.95, i.e. equal to 1:1.

As described above, in this embodiment, the read-out gains of the photomultipliers 7 and 8 are corrected such that the ratio $S_{m1}:S_{m2}$ between the mean values of the reference signals $S_1$ and $S_2$, which have been obtained from the stimulable phosphor sheet 10 having been uniformly exposed to radiation, may become equal to the reference value. Therefore, even if the read-out gains of the photomultipliers 7 and 8 change with the passage of time, the optimum addition ratio can be prevented from changing, and an addition image signal can be obtained by adding the image signals $S_D$ and $S_D'$ in the optimum addition ratio.

Figure 4:
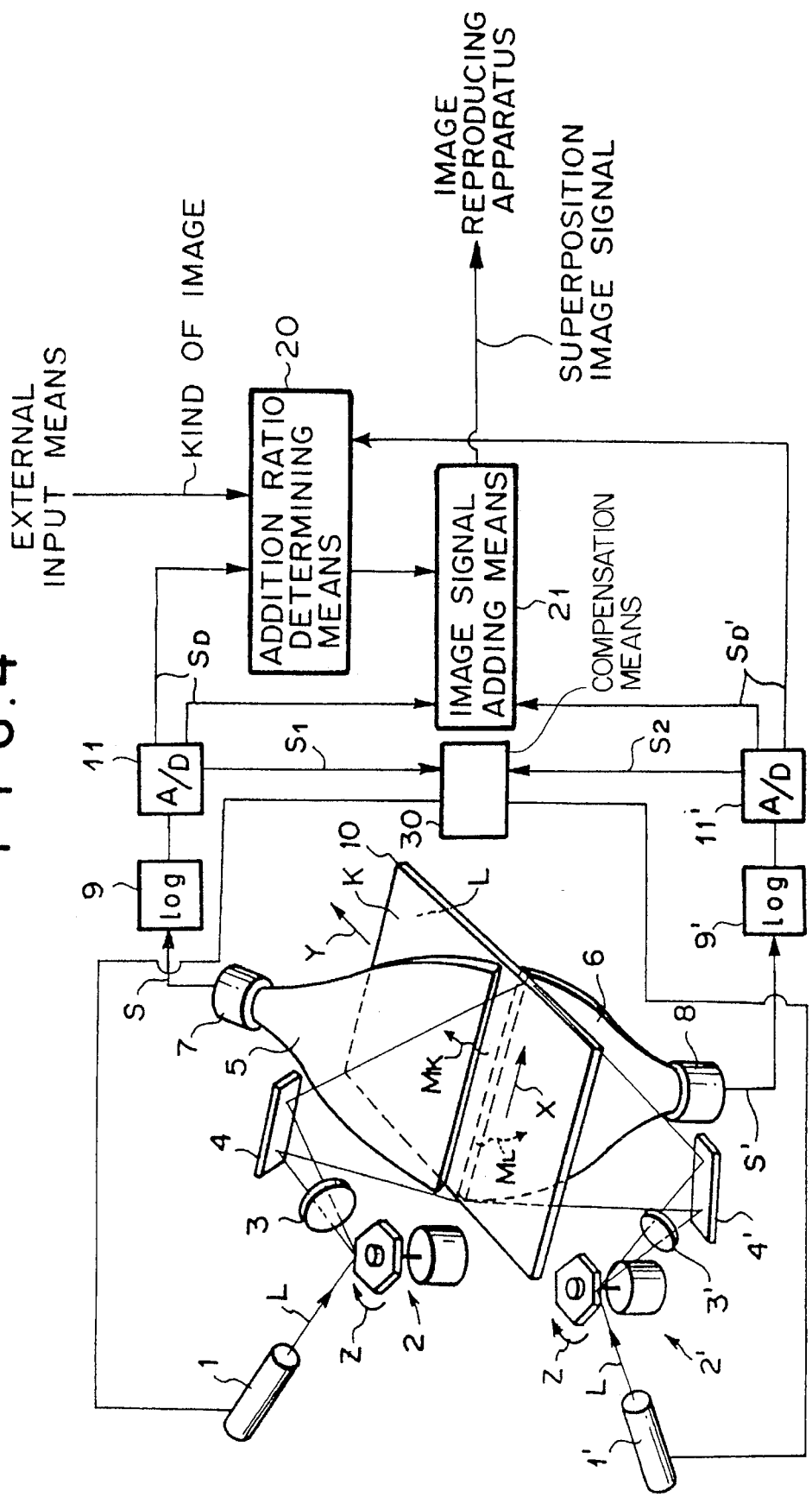
FIG. 4 is a block diagram showing a second embodiment of the radiation image read-out apparatus in accordance with the present invention.

In the embodiment described above, the read-out gains of the photomultipliers 7 and 8 are corrected in accordance with the ratio $S_{m1}:S_{m2}$ between the mean values of the reference signals $S_1$ and $S_2$. In a second embodiment shown in FIG. 4, laser beams L and L', which have been produced by two laser beam sources 1 and 1', are respectively irradiated to the front and back surfaces of the stimulable phosphor sheet 10, and the image signals $S_D$ and $S_D'$ are thereby obtained. In such cases, besides the changes of the read-out gains of the photomultipliers 7 and 8, it may occur that the intensities of the laser beams L and L' change and, as a result, the actual addition ratio for the image signals $S_D$ and $S_D'$ changes. In cases where the two laser beam sources 1 and 1' are thus used, the output power of the laser beam source 1 and the output power of the laser beam source 1' may be corrected in accordance with the ratio $S_{m1}:S_{m2}$ between the mean values of the reference signals $S_1$ and $S_2$.

Specifically, in cases where the ratio $S_{m1}:S_{m2}$ calculated by the compensation means 30 is equal to 1:0.9, instead of the read-out gain of the photomultiplier 8 being increased by 10%, the output power of the laser beam source is increased by 10%. In cases where the output power of the laser beam source 1' is thus increased, as in cases where the read-out gain of the photomultiplier 8 is increased, the addition ratio for the image signals $S_D$ and $S_D$' can be kept optimum.

Also, in the first and second embodiments described above, the compensation for the change of the addition ratio with the passage of time is carried out by correcting the read-out gains of the photomultipliers 7 and 8 or by correcting the output power of the laser beam sources 1 and 1'. Alternatively, the compensation for the change of the addition ratio with the passage of time may be carried out by changing the amplification factors of the logarithmic amplifiers 9 and 9' in accordance with the ratio between the representative values of the reference signals $S_1$ and $S_2$.

Specifically, in cases where the ratio $S_{m1}:S_{m2}$ calculated by the compensation means 30 is equal to 1:0.9, the amplification factor of the logarithmic amplifier 9' is increased by 10%. In cases where the amplification factor of the logarithmic amplifier 9' is thus increased, the addition ratio for the image signals $S_D$ and $S_D$' can be kept optimum.

As a further alternative, the addition ratio for the image signals $S_D$ and $S_D$' in the image signal adding means 21 may be changed in accordance with the ratio between the representative values of the reference signals $S_1$ and $S_2$. In cases where the addition ratio for the image signals $S_D$ and $S_D$' in the image signal adding means 21 is thus changed, without particular time and labor being required, the optimum addition ratio can be prevented from changing, and an addition image signal can be obtained by adding the image signals $S_D$ and $S_D$' in the optimum addition ratio.

Figure 5:
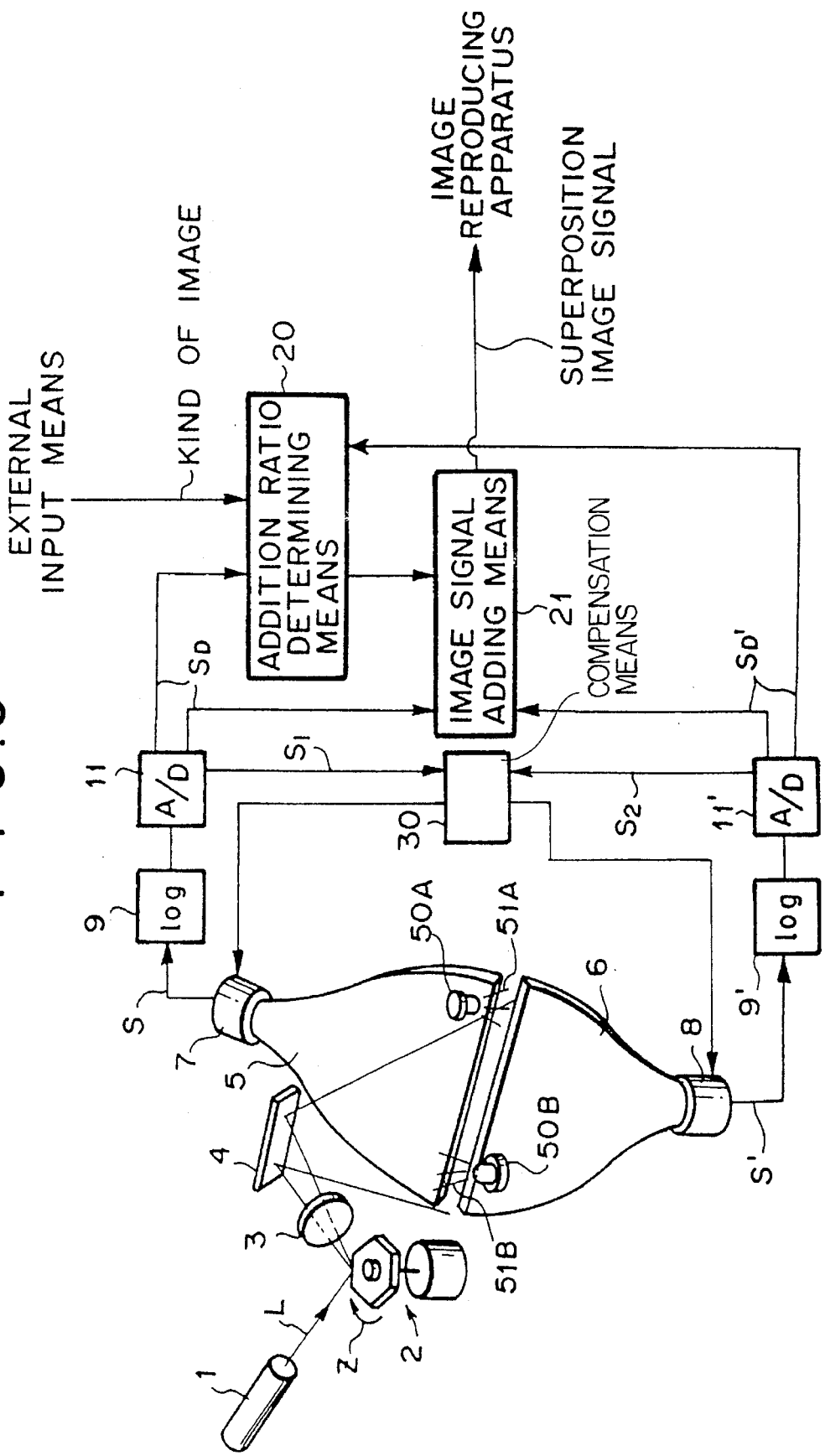
FIG. 5 is a block diagram showing a third embodiment of the radiation image read-out apparatus in accordance with the present invention.

Further, in the first and second embodiments described above, the uniform signals are obtained from the stimulable phosphor sheet 10, which has been exposed uniformly to radiation, the uniform signals are used as the reference signals, and the addition ratio for the image signals $S_D$ and $S_D$' is thereby corrected. Alternatively, for example, as in a third embodiment illustrated in FIG. 5, two reference light sources 50A and 50B, which respectively produce reference light 51A and reference light 51B, may be located such that the reference light 51A, which has been produced by the reference light source 50A, can be detected by the photomultiplier 8, and such that the reference light 51B, which has been produced by the reference light source 50B, can be detected by the photomultiplier 7. The reference light 51B and the reference light 51A, which have been produced respectively by the reference light sources 50B and 50A, may be photoelectrically detected by the photomultipliers 7 and 8, and the signals obtained in this manner may be utilized as the reference signals $S_1$ and $S_2$. In cases where the reference light sources 50B and 50A are located in this manner, even if the constitution of the radiation image read-out apparatus becomes comparatively complicated, the compensation for the change of the addition ratio with the passage of time can be carried out.

Figure 6:
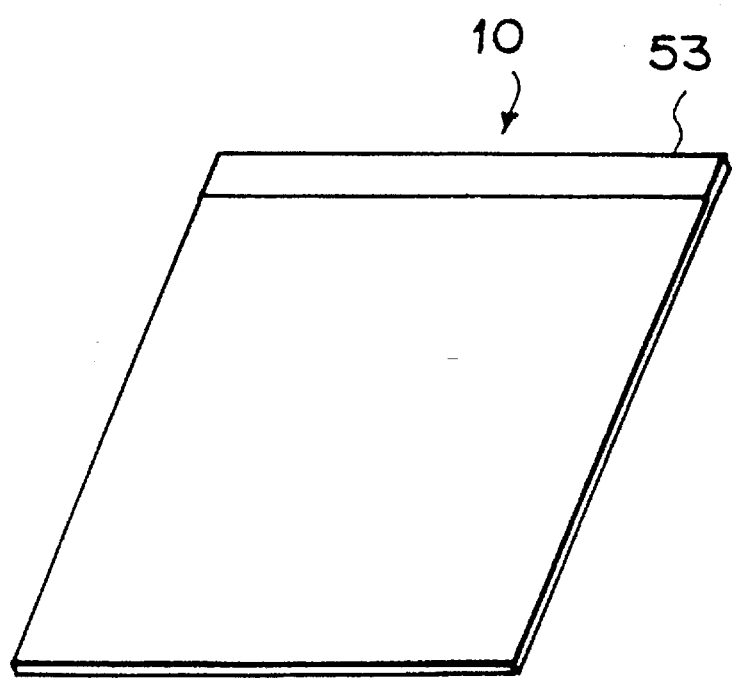
FIG. 6 is a perspective view showing a stimulable phosphor sheet provided with a fluorescent substance, which produces the fluorescence when it is exposed to stimulating rays.
Figure 7:
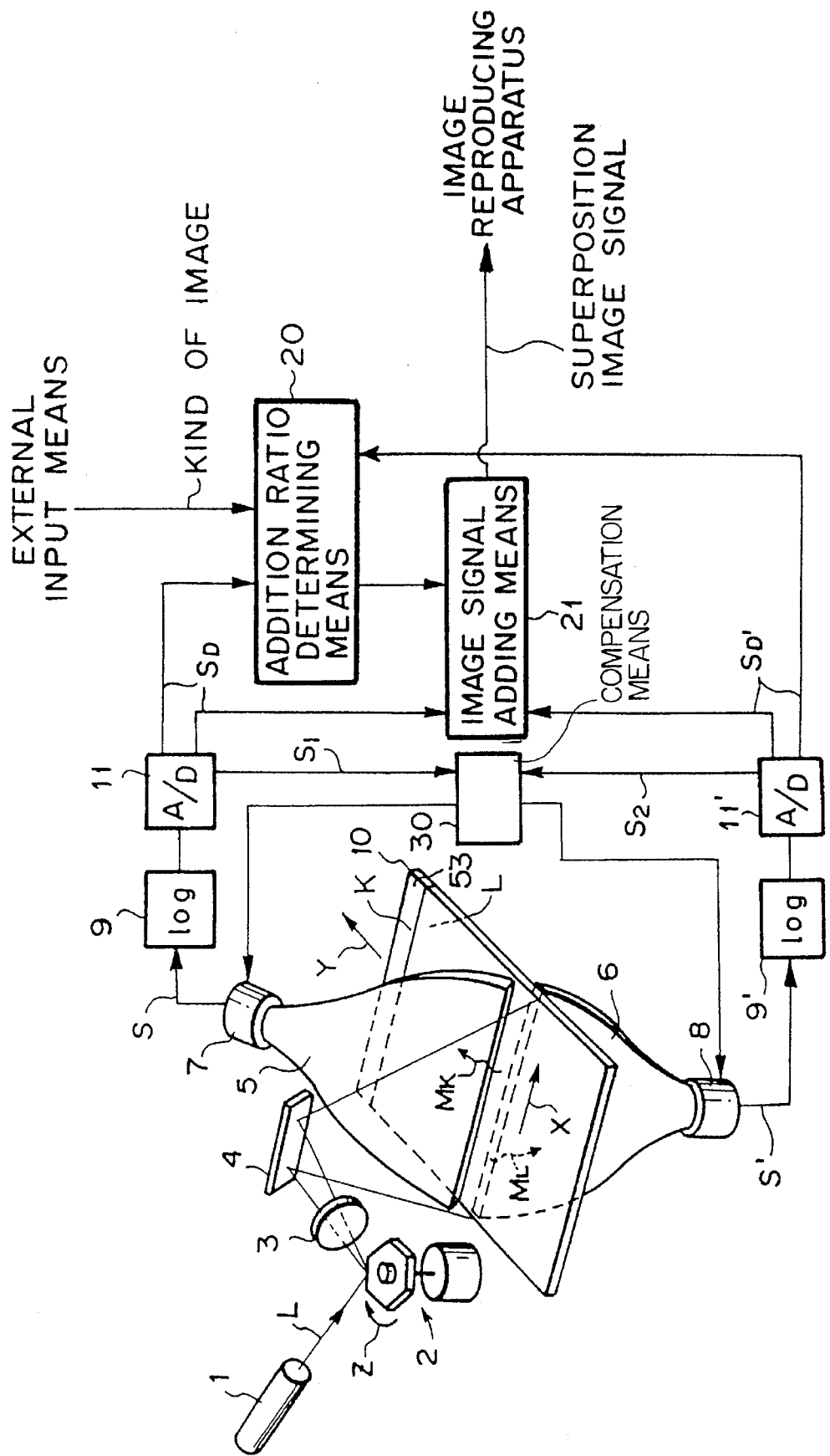
FIG. 7 is a block diagram showing a fourth embodiment of the radiation image read-out apparatus in accordance with the present invention.

Furthermore, as illustrated in FIG. 6, a fluorescent substance 53, which produces the fluorescence capable of being detected by the photomultipliers 7 and 8 when it is exposed to the stimulating rays, may be located at a leading end of the stimulable phosphor sheet 10. As in a fourth embodiment shown in FIG. 7, the fluorescence, which is produced by the front surface and the back surface of the fluorescent substance 53 when the fluorescent substance 53 is exposed to the stimulating rays, may be photoelectrically detected from the front and back surfaces of the fluorescent substance. Also, the light emitted by the front and back surfaces of the stimulable phosphor sheet 10 may be detected photoelectrically. The two signals, which have been obtained by photoelectrically converting the fluorescence, may be utilized as the reference signals. In this manner, the fluorescent substance 53 should preferably be located at the leading end of the stimulable phosphor sheet 10. In such cases, the fluorescent substance 53 is first exposed to the stimulating rays and caused to produce the fluorescence. The fluorescence is photoelectrically detected by the photomultipliers 7 and 8, and the reference signals $S_1$ and $S_2$ are thereby obtained. Therefore, the compensation for the change of the addition ratio can be immediately carried out in accordance with the reference signals $S_1$ and $S_2$. Thereafter, the light emitted by the stimulable phosphor sheet 10 is photoelectrically detected by the photomultipliers 7 and 8, and the image signals $S_D$ and $S_D$' representing the radiation image are thereby obtained. When the image signals $S_D$ and $S_D$' are added to each other, the addition ratio, which has thus been corrected, can be utilized.

Examples of the fluorescent substance 53, which produces the fluorescence capable of being detected by the photomultipliers 7 and 8 when it is exposed to the stimulating rays, include a material comprising a binder and $\gamma\text{-AlF}_3:\text{Fe}^{3+}$, which is dispersed in the binder and produces the fluorescence having a peak wavelength in the vicinity of 750 nm when being exposed to the stimulating rays, and a material comprising a binder and $\text{NaYb(WO}_4)_2:\text{Er}$, which is dispersed in the binder and produces the fluorescence having a peak wavelength in the vicinity of 525 nm when being exposed to the stimulating rays having a wavelength of 850nm and having been produced by a GaAs semiconductor laser.

Figure 8:
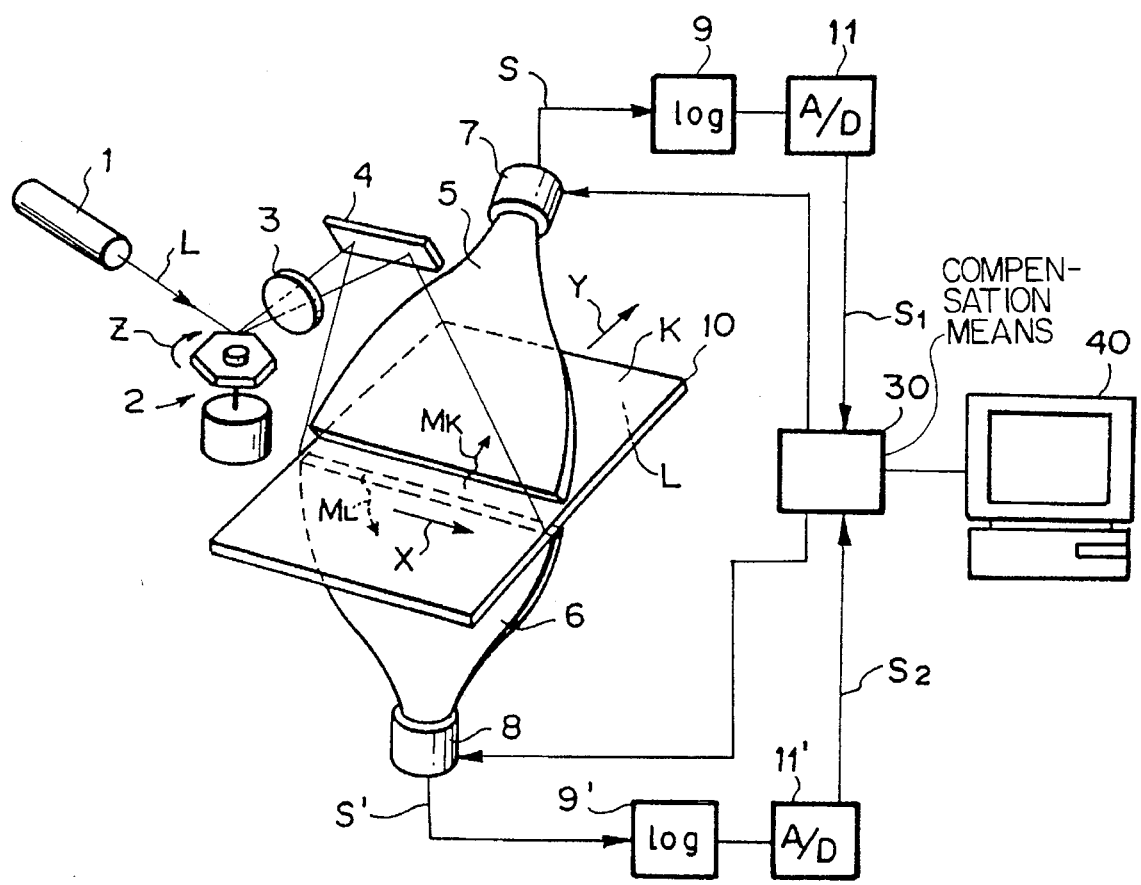
FIG. 8 is a block diagram showing a fifth embodiment of the radiation image read-out apparatus in accordance with the present invention.

Also, in the embodiments described above, the addition ratio for the image signals $S_D$ and $S_D$' is corrected in accordance with the representative values of the reference signals $S_1$ and $S_2$. Alternatively, as in a fifth embodiment shown in FIG. 8, information representing the results of comparison of the ratio between the representative values of the reference signals $S_1$ and $S_2$ and the reference value may be fed from the compensation means 30 into a cathode ray tube (CRT) display device 40, which is used to display a superposition image. In this manner, the results of the comparison may be displayed on the CRT display device 40. In such cases, the operator of the CRT display device 40 can view the results of the comparison, which are displayed on the CRT display device 40, and can correct the addition ratio, the read-out gains of the photomultipliers 7 and 8, or the like. Further, instead of the results of the comparison being merely displayed on the CRT display device 40, in cases where it has been detected from the results of the comparison that the ratio between the representative values of the reference signals $S_1$ and $S_2$ is different from the reference value, an alarm may be issued by the CRT display device 40. In FIG. 8, as an aid in facilitating the explanation, the addition ratio determining means 20 and the image signal adding means 21 are not shown.

Further, in the compensation means 30, after the ratio between the representative values of the reference signals $S_1$ and $S_2$ has been calculated, the ratio between the representative values may be compared with a certain range of reference values (i.e., a reference range). In this manner, it may be detected whether the ratio between the representative values falls or does not fall within the reference range. In accordance with the results of the detection, the change of the addition ratio with the passage of time can be compensated for. Alternatively, the results of the detection may be displayed on the CRT display device, or an alarm may be issued.

The reference value or the reference range should preferably be varied in accordance with the amount of light, which is emitted by the stimulable phosphor sheet 10 and detected as each image signal, (or the dose of radiation irradiated to the stimulable phosphor sheet 10), the kind of the stimulable phosphor sheet 10, the spatial frequency of interest in the radiation image, and the conditions under which the radiation was irradiated, e.g. the direction of irradiation of the radiation.

Figure 9A:
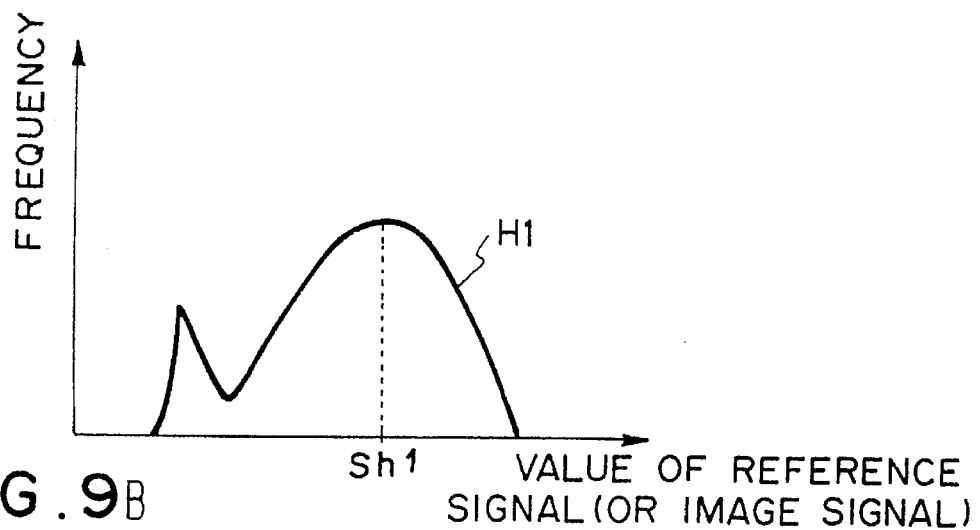
FIG. 9 is graphs showing examples of probability density functions of reference signals (or image signals)
Figure 9B:
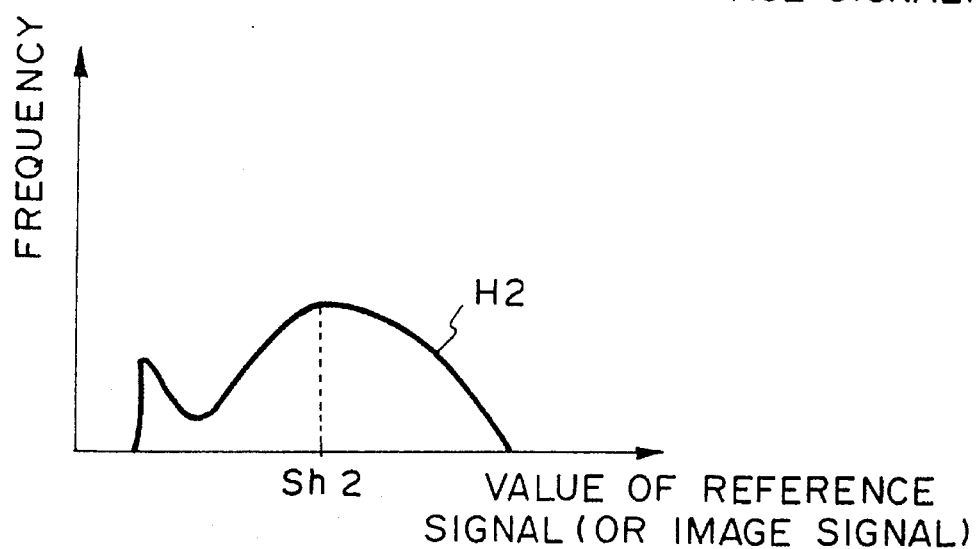

In the embodiments described above, the mean value $S_{m1}$ of the values of the reference signal $S_1$, which corresponds to the entire area of the image region, is calculated. Also, the mean value $S_{m2}$ of the values of the reference signal $S_2$, which corresponds to the entire area of the image region, is calculated. Thereafter, the ratio $S_{m1}:S_{m2}$ between the mean values $S_{m1}$ and $S_{m2}$ is calculated. Alternatively, the mean value of the values of the reference signal $S_1$, which corresponds to a portion of the image region, and the mean value of the values of the reference signal $S_2$, which corresponds to a portion of the image region, may be calculated. Thereafter, the ratio between such mean values may be calculated and used. As another alternative, the median value of the values of the reference signal $S_1$, which corresponds to the entire area of the image region or a portion of the image region, and the median value of the values of the reference signal $S_2$, which corresponds to the entire area of the image region or a portion of the image region, may be calculated. Thereafter, the ratio between such mean values may be calculated and used. As a further alternative, probability density functions of the reference signals $S_1$ and $S_2$ may be calculated, and the ratio between the peak values of the probability density functions may be used. Specifically, as illustrated in FIG. 9, the ratio between a peak value $S_{h1}$ of a probability density function H1 of the reference signal $S_1$ and a peak value $S_{h2}$ of a probability density function H2 of the reference signal $S_2$ may be used.

The radiation image read-out apparatus in accordance with the present invention is not limited to the embodiments described above and may be embodied in any of various other ways. The radiation image read-out apparatus in accordance with the present invention may be set such that the addition ratio, in which the two image signals (i.e. the two digital image signals) are added to each other, may be changed in accordance with at least a single factor selected from the group consisting of the amount of the light, which is emitted by the stimulable phosphor sheet 10 and detected as each image signal, (i.e., the dose of the radiation irradiated to the stimulable phosphor sheet 10), the kind of the stimulable phosphor sheet 10, the spatial frequency of interest in the radiation image, and the conditions under which the radiation was irradiated, e.g. the direction of irradiation of the radiation.

As in the image processing step carried out in the conventional radiation image recording and reproducing system described above, the first to fifth embodiments of the radiation image read-out apparatus in accordance with the present invention may be set such that the first image signal S obtained from the first photomultiplier 7 and the second image signal S' obtained from the second photomultiplier 8 may be logarithmically converted before being subjected to the analog-to-digital conversion, and the addition is carried out after the logarithmic conversion of the image signals.

Figure 10:
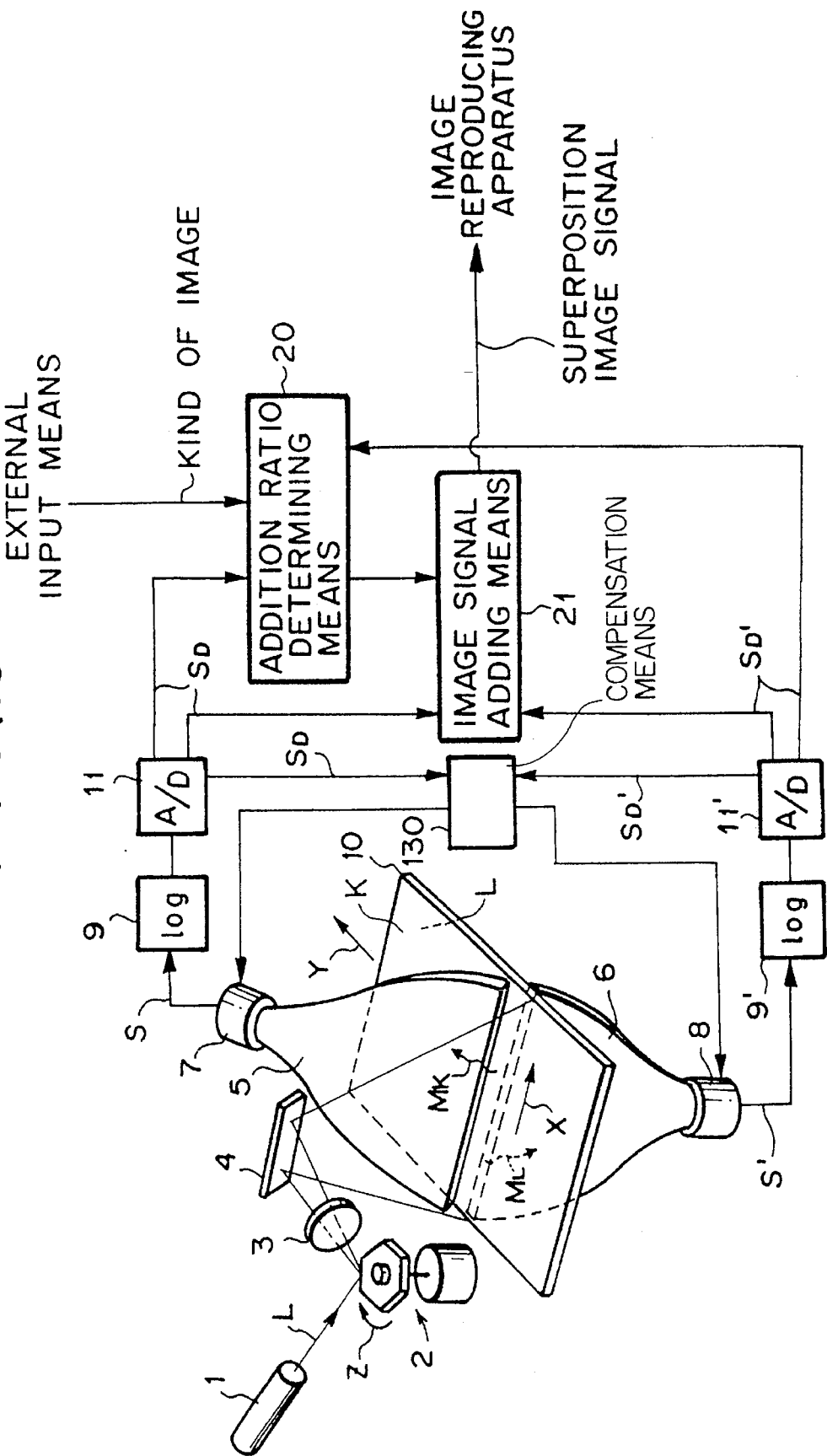
FIG. 10 is a block diagram showing a sixth embodiment of the radiation image read-out apparatus in accordance with the present invention.
Figure 12:
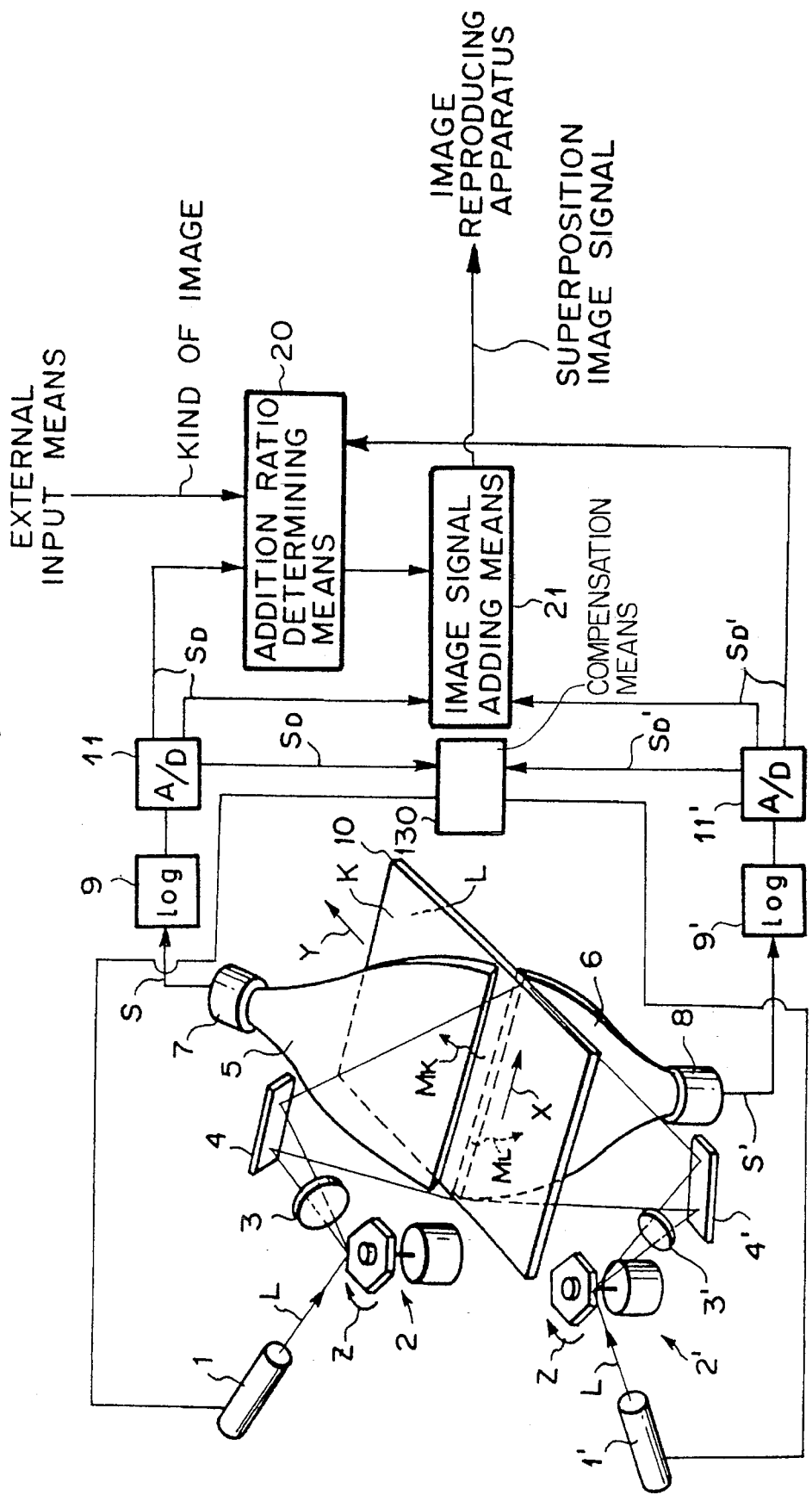
Figure 13:
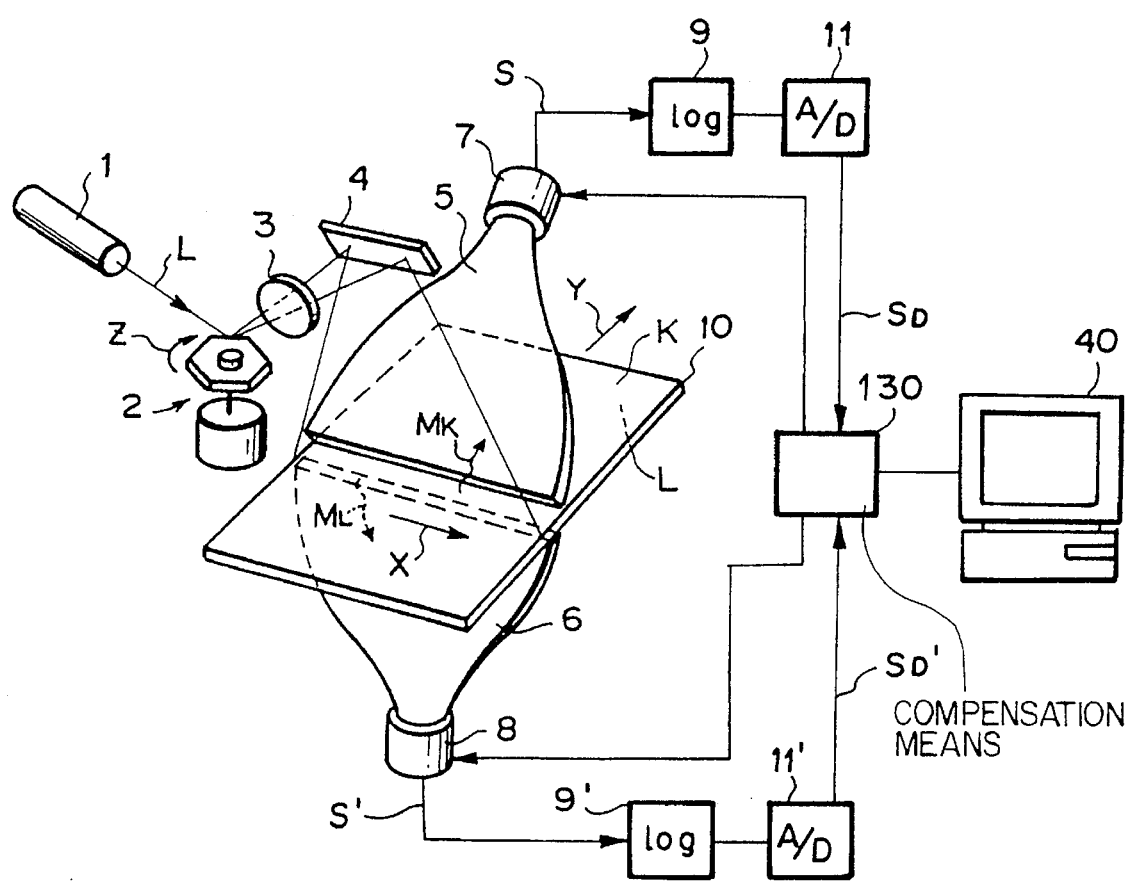
FIG. 13 is a block diagram showing an eighth embodiment of the radiation image read-out apparatus in accordance with the present invention.

Sixth, seventh, and eighth embodiments of the radiation image read-out apparatus in accordance with the present invention will be described hereinbelow with reference to FIGS. 10, 11, 12, and 13. In FIGS. 10, 12, and 13, similar elements are numbered with the same reference numerals with respect to FIG. 1.

FIG. 10 is a block diagram showing the sixth embodiment of the radiation image read-out apparatus in accordance with the present invention. This embodiment is provided with a compensation means 130 for correcting the read-out gains of the first photomultiplier 7 and the second photomultiplier 8.

In the compensation means 130, the read-out gains of the photomultipliers 7 and 8 are corrected each time a predetermined period has elapsed, and the optimum addition ratio is thereby kept. How processing is carried out by the compensation means 130 will be described hereinbelow.

The stimulable phosphor sheet 10, on which the radiation image has been stored, is exposed to the laser beam L, which has been produced by the laser beam source 1. In this manner, the radiation image is read out from the front and back surfaces of the stimulable phosphor sheet 10, and the first image signal $S_D$ and the second image signal $S_D'$ are thereby obtained.

Figure 11:
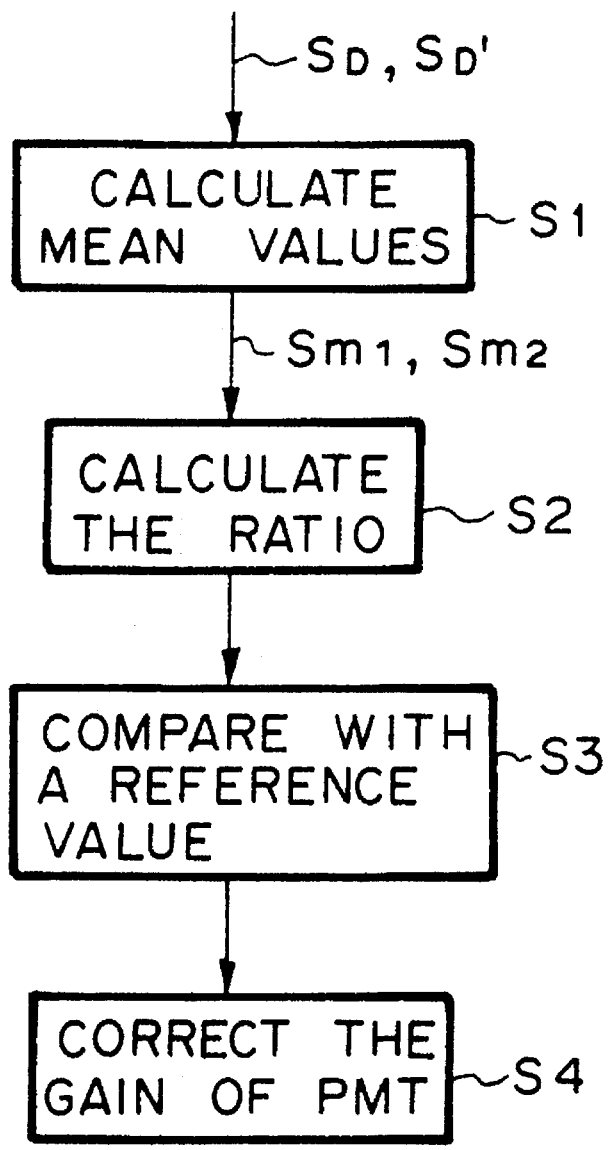
FIG. 11 is a flow chart showing how a change of the addition ratio with the passage of time is compensated for, FIG. 12 is a block diagram showing a seventh embodiment of the radiation image read-out apparatus in accordance with the present invention.

The image signals $S_D$ and $S_D'$ are fed into the compensation means 130 and subjected to the processing shown in FIG. 11.

With reference to FIG. 11, in a step S1, the mean value $S_{m1}$ of the values of the image signal $S_D$, which corresponds to the entire area of the image region, is calculated. Also, the mean value $S_{m2}$ of the values of the image signal $S_D'$, which corresponds to the entire area of the image region, is calculated. Thereafter, in a step S2, the ratio $S_{m1}:S_{m2}$ between the mean values $S_{m1}$ and $S_{m2}$ is calculated. In a step S3, the calculated ratio $S_{m1}:S_{m2}$ and the reference value, i.e. the value of the ratio between representative values, which are obtained with the two photoelectric read-out means having the initially set read-out gains, are compared with each other. In this embodiment, the reference value is set to be 1:1. In a step 4, in cases where the calculated ratio $S_{m1}:S_{m2}$ is 1:0.9 and is thus different from the reference value, the read-out gains of the photomultipliers (PMT's) 7 and 8 are corrected. Specifically, in this embodiment, because the mean value $S_{m2}$ of the values of the image signal $S_D'$, which has been obtained from the back surface of the stimulable phosphor sheet 10, has decreased by 10%, the compensation means 130 increases the high voltage, which is applied to the photomultiplier 8 located on the back surface side of the stimulable phosphor sheet 10. In this manner, the compensation means 130 increases the read-out gain of the photomultiplier 8 by 10% such that the ratio $S_{m1}:S_{m2}$ may become equal to 1:1.

In cases where the read-out gains of the photomultipliers 7 and 8 are corrected in the manner described above, when two image signals representing a radiation image are obtained from a next stimulable phosphor sheet 10, on which the radiation image has been stored, the addition ratio, in which the two image signals are added to each other, becomes equal to the originally set value.

As described above, in the sixth embodiment, the read-out gains of the photomultipliers 7 and 8 are corrected such that the ratio $S_{m1}:S_{m2}$ between the mean values of the image signals $S_D$ and $S_D'$ having been obtained from the stimulable phosphor sheet 10, on which the radiation image has been stored, may become equal to the reference value. Therefore, even if the read-out gains of the photomultipliers 7 and 8 change with the passage of time, without any particular time and labor being required, the optimum addition ratio can be prevented from changing, and an addition image signal can be obtained by adding the image signals $S_D$ and $S_D'$ in the optimum addition ratio.

In the sixth embodiment described above, the read-out gains of the photomultipliers 7 and 8 are corrected in accordance with the ratio $S_{m1}:S_{m2}$ between the mean values of the image signals $S_D$ and $S_D'$, which correspond to the entire area of the image region. In a seventh embodiment shown in FIG. 12, the laser beams L and L', which have been produced by two laser beam sources 1 and 1', are respectively irradiated to the front and back surfaces of the stimulable phosphor sheet 10, and the image signals $S_D$ and $S_D'$ are thereby obtained. In such cases, besides the changes of the read-out gains of the photomultipliers 7 and 8, it may occur that the intensities of the laser beams L and L' change and, as a result, the actual addition ratio for the image signals $S_D$ and $S_D'$ changes. In cases where the two laser beam sources 1 and 1' are thus used, the output power of the laser beam source 1 and the output power of the laser beam source 1' may be corrected in accordance with the ratio $Sm_1:S_{m2}$ between the mean values of the image signals $S_D$ and $S_D'$.

Specifically, in cases where the ratio $S_{m1}:S_{m2}$ calculated by the compensation means 130 is equal to 1:0.9, instead of the read-out gain of the photomultiplier 8 being increased by 10%, the output power of the laser beam source 1' is increased by 10%. In cases where the output power of the laser beam source 1' is thus increased, as in cases where the read-out gain of the photomultiplier 8 is increased, the addition ratio for the image signals $S_D$ and $S_D'$ can be kept optimum.

Also, in the sixth and seventh embodiments described above, the mean value $S_{m1}$ of the values of the image signal $S_D$, which corresponds to the entire area of the image region, is calculated. Also, the mean value $S_{m2}$ of the values of the image signal $S_D'$, which corresponds to the entire area of the image region, is calculated. Thereafter, the ratio $S_{m1}:S_{m2}$ between the mean values $S_{m1}$ and $S_{m2}$ is calculated. Alternatively, the mean value of the values of the image signal $S_D$, which corresponds to a portion of the image region, and the mean value of the values of the image signal $S_D'$, which corresponds to a portion of the image region, may be calculated. Thereafter, the ratio between such mean values may be calculated and used. As another alternative, the median value of the values of the image signal $S_D$, which corresponds to the entire area of the image region or a portion of the image region, and the median value of the values of the image signal $S_D'$, which corresponds to the entire area of the image region or a portion of the image region, may be calculated. Thereafter, the ratio between such mean values may be calculated and used. As a further alternative, as illustrated in FIG. 9, the ratio between a peak value $S_{h1}$ of a probability density function H1 of the image signal $S_D$ and a peak value $S_{h2}$ of a probability density function H2 of the image signal $S_D'$ may be used.

Further, in the sixth and seventh embodiments described above, the compensation for the change of the addition ratio with the passage of time is carried out by correcting the read-out gains of the photomultipliers 7 and 8 or by correcting the output power of the laser beam sources 1 and 1'. Alternatively, the compensation for the change of the addition ratio with the passage of time may be carried out by changing the amplification factors of the logarithmic amplifiers 9 and 9' in accordance with the ratio between the representative values of the image signals $S_D$ and $S_D'$.

Specifically, in cases where the ratio $S_{m1}:S_{m2}$ calculated by the compensation means 130 is equal to 1:0.9, the amplification factor of the logarithmic amplifier 9' is increased by 10%. In cases where the amplification factor of the logarithmic amplifier 9' is thus increased, the addition ratio for the image signals $S_D$ and $S_D'$ can be kept optimum.

In the manner described above, the amplification factors of the logarithmic amplifiers 9 and 9' should preferably be corrected. In such cases, in accordance with the results of the comparison of the ratio between the representative values and the reference value, the logarithmic amplification factors for the image signals $S_D$ and $S_D'$, from which the representative values have been calculated, can be changed, and the addition ratio for the image signals $S_D$ and $S_D'$, from which the representative values have been calculated, can be made optimum.

As a further alternative, the addition ratio for the image signals $S_D$ and $S_D'$ in the image signal adding means 21 may be changed in accordance with the ratio between the representative values of the image signals $S_D$ and $S_D'$. Such a further alternative is advantageous in that the addition ratio can be corrected immediately with respect to the image signals having been detected. In cases where the addition ratio for the image signals $S_D$ and $S_D'$ in the image signal adding means 21 is thus changed, without particular time and labor being required, the optimum addition ratio can be prevented from changing, and an addition image signal can be obtained by adding the image signals $S_D$ and $S_D'$ in the optimum addition ratio.

Further, in the sixth and seventh embodiments described above, the addition ratio for the image signals $S_D$ and $S_D'$ is corrected in accordance with the representative values of the image signals $S_D$ and $S_D'$. Alternatively, as in an eighth embodiment shown in FIG. 13, information representing the results of comparison of the ratio between the representative values of the image signals $S_D$ and $S_D'$ and the reference value may be fed from the compensation means 130 into a CRT display device 40, which is used to display a superposition image. In this manner, the results of the comparison may be displayed on the CRT display device 40. In such cases, the operator of the CRT display device 40 can view the results of the comparison, which are displayed on the CRT display device 40, and can correct the addition ratio, the read-out gains of the photomultipliers 7 and 8, or the like. Further, instead of the results of the comparison being merely displayed on the CRT display device 40, in cases where it has been detected from the results of the comparison that the ratio between the representative values of the image signals $S_D$ and $S_D'$ is different from the reference value, an alarm may be issued by the CRT display device 40. In FIG. 13, as an aid in facilitating the explanation, the addition ratio determining means 20 and the image signal adding means 21 are not shown.

Further, in the compensation means 130, the ratio between the representative values of the image signals $S_D$ and $S_D'$ is compared with the reference value. Alternatively, the ratio between the representative values may be compared with a certain range of reference values (i.e., a reference range). In this manner, it may be detected whether the ratio between the representative values falls or does not fall within the reference range. In accordance with the results of the detection, the change of the addition ratio with the passage of time can be compensated for. Alternatively, the results of the detection may be displayed on the CRT display device, or an alarm may be issued.

The reference value or the reference range should preferably be varied in accordance with the amount of light, which is emitted by the stimulable phosphor sheet 10 and detected as each image signal, (or the dose of radiation irradiated to the stimulable phosphor sheet 10), the kind of the stimulable phosphor sheet 10, the spatial frequency of interest in the radiation image, and the conditions under which the radiation was irradiated, e.g. the direction of irradiation of the radiation.

As in the image processing step carried out in the conventional radiation image recording and reproducing system described above, the sixth, seventh, and eighth embodiments of the radiation image read-out apparatus in accordance with the present invention may be set such that the first image signal S obtained from the first photomultiplier 7 and the second image signal S' obtained from the second photomultiplier 8 may be logarithmically converted before being subjected to the analog-to-digital conversion, and the addition is carried out after the logarithmic conversion of the image signals.

What is claimed is:

1. A radiation image read-out method comprising the steps of:
   i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
   ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
   iii) adding the two image signals to each other in a predetermined addition ratio, an addition image signal, which represents the radiation image, being thereby obtained,
   wherein the improvement comprises the steps of:
   a) photoelectrically detecting predetermined reference light with the two photoelectric read-out means, two reference signals being thereby obtained,
   b) calculating a representative value of each of the two reference signals, two representative values being thereby obtained,
   c) calculating the ratio between said two representative values, and
   d) compensating for a change of the addition ratio with the passage of time in accordance with said ratio between said two representative values.

2. A method as defined in claim 1 wherein the read-out gain of each of the two photoelectric read-out means has been set such that the ratio between the read-out gains of the two photoelectric read-out means may be equal to a predetermined value, and
   the compensation for a change of the addition ratio with the passage of time, which change is due to a change of the read-out gains after they have been set in the two photoelectric read-out means, is carried out by correcting the read-out gain in each of the two photoelectric read-out means such that the ratio between the read-out gains of the two photoelectric read-out means may become equal to said predetermined value.

3. A method as defined in claim 1 wherein the two image signals are obtained by exposing the front surface of the stimulable phosphor sheet to the stimulating rays, which have been produced by one of two stimulating ray sources, and exposing the back surface of the stimulable phosphor sheet to the stimulating rays, which have been produced by the other stimulating ray source, and
   the compensation for a change of the addition ratio with the passage of time is carried out by correcting the output power of each of the two stimulating ray sources.

4. A method as defined in claim 1, 2, or 3 wherein said predetermined reference light is the light emitted from the front surface and the back surface of a stimulable phosphor sheet, which has been uniformly exposed to radiation, when said stimulable phosphor sheet, which has been uniformly exposed to radiation, is exposed to the stimulating rays.

5. A method as defined in claim 1, 2, or 3 wherein said predetermined reference light is the light produced by reference light sources.

6. A method as defined in claim 1, 2, or 3 wherein said predetermined reference light is the fluorescence produced by the front surface and the back surface of a fluorescent substance when said fluorescent substance is exposed to the stimulating rays, said fluorescent substance being located at a portion of the stimulable phosphor sheet and producing the fluorescence, which is capable of being detected by the two photoelectric read-out means, when said fluorescent substance is exposed to the stimulating rays.

7. A radiation image read-out method comprising the steps of:
   i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
   ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
   iii) adding the two image signals to each other in a predetermined addition ratio, an addition image signal, which represents the radiation image, being thereby obtained,
   wherein the improvement comprises the steps of:
   a) photoelectrically detecting predetermined reference light with the two photoelectric read-out means, two reference signals being thereby obtained,
   b) calculating a representative value of each of the two reference signals, two representative values being thereby obtained,
   c) calculating the ratio between said two representative values, and
   d) detecting whether said ratio between said two representative values falls or does not fall within a predetermined range.

8. A radiation image read-out apparatus comprising:
   i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
   ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and
   iii) a means for adding the two image signals to each other in a predetermined addition ratio, an addition image signal, which represents the radiation image, being thereby obtained,
   wherein the improvement comprises the provision of:
   a) a reference signal detecting means for photoelectrically detecting predetermined reference light with the two photoelectric read-out means, two reference signals being thereby obtained, b) a representative value calculating means for calculating a representative value of each of the two reference signals, two representative values being thereby obtained, c) a ratio calculating means for calculating the ratio between said two representative values, and d) a compensation means for compensating for a change of the addition ratio with the passage of time in accordance with said ratio between said two representative values.

9. An apparatus as defined in claim 8 wherein the read-out gain of each of the two photoelectric read-out means has been set such that the ratio between the read-out gains of the two photoelectric read-out means may be equal to a predetermined value, and said compensation means carries out the compensation for a change of the addition ratio with the passage of time, which change is due to a change of the read-out gains after they have been set in the two photoelectric read-out means, by correcting the read-out gain in each of the two photoelectric read-out means such that the ratio between the read-out gains of the two photoelectric read-out means may become equal to said predetermined value.

10. An apparatus as defined in claim 8 wherein two stimulating ray sources are located as said stimulating ray source such that one of said two stimulating ray sources may irradiate the stimulating rays to the front surface of the stimulable phosphor sheet, and such that the other stimulating ray source may irradiate the stimulating rays to the back surface of the stimulable phosphor sheet, and said compensation means carries out the compensation for a change of the addition ratio with the passage of time by correcting the output power of each of said two stimulating ray sources.

11. An apparatus as defined in claim 8, 9, or 10 wherein said predetermined reference light is the light emitted from the front surface and the back surface of a stimulable phosphor sheet, which has been uniformly exposed to radiation, when said stimulable phosphor sheet, which has been uniformly exposed to radiation, is exposed to the stimulating rays.

12. An apparatus as defined in claim 8, 9, or 10 wherein said predetermined reference light is the light produced by reference light sources.

13. An apparatus as defined in claim 8, 9, or 10 wherein said predetermined reference light is the fluorescence produced by the front surface and the back surface of a fluorescent substance when said fluorescent substance is exposed to the stimulating rays, said fluorescent substance being located at a portion of the stimulable phosphor sheet and producing the fluorescence, which is capable of being detected by the two photoelectric read-out means, when said fluorescent substance is exposed to the stimulating rays.

14. A radiation image read-out apparatus comprising:

i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and iii) a means for adding the two image signals to each other in a predetermined addition ratio, an addition image signal, which represents the radiation image, being thereby obtained, wherein the improvement comprises the provision of:

a) a reference signal detecting means for photoelectrically detecting predetermined reference light with the two photoelectric read-out means, two reference signals being thereby obtained, b) a representative value calculating means for calculating a representative value of each of the two reference signals, two representative values being thereby obtained, c) a ratio calculating means for calculating the ratio between said two representative values, and d) a detection means for detecting whether said ratio between said two representative values falls or does not fall within a predetermined range.

15. A radiation image read-out method comprising the steps of:

i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and iii) adding the two image signals to each other in a predetermined addition ratio, an addition image signal, which represents the radiation image, being thereby obtained, wherein the improvement comprises the steps of:

a) photoelectrically detecting predetermined reference light with the two photoelectric read-out means, two reference signals being thereby obtained, b) calculating a representative value of each of the two reference signals, two representative values being thereby obtained, c) calculating the ratio between said two representative values, d) comparing said ratio between said two representative values with a reference value, and e) feeding out information representing the results of the comparison.

16. A radiation image read-out apparatus comprising:

i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and iii) a means for adding the two image signals to each other in a predetermined addition ratio, an addition image signal, which represents the radiation image, being thereby obtained, wherein the improvement comprises the provision of:
  a) a reference signal detecting means for photoelectrically detecting predetermined reference light with the two photoelectric read-out means, two reference signals being thereby obtained,
  b) a representative value calculating means for calculating a representative value of each of the two reference signals, two representative values being thereby obtained,
  c) a ratio calculating means for calculating the ratio between said two representative values,
  d) a comparison means for comparing said ratio between said two representative values with a reference value, and
  e) an output means for feeding out information representing the results of the comparison carried out by said comparison means.

17. A radiation image read-out method comprising the steps of:
  i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
  ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
  iii) adding the two image signals to each other in a predetermined addition ratio, an addition image signal, which represents the radiation image, being thereby obtained, wherein the improvement comprises the steps of:
  a) calculating a representative value of each of the two image signals, two representative values being thereby obtained,
  b) calculating the ratio between said two representative values,
  c) comparing said ratio between said two representative values with a reference value, and
  d) compensating for a change of the addition ratio with the passage of time in accordance with the results of the comparison.

18. A method as defined in claim 17 wherein the read-out gain of each of the two photoelectric read-out means has been set such that the ratio between the read-out gains of the two photoelectric read-out means may be equal to a predetermined value, and
  the compensation for a change of the addition ratio with the passage of time, which change is due to a change of the read-out gains after they have been set in the two photoelectric read-out means, is carried out by correcting the read-out gain in each of the two photoelectric read-out means such that the ratio between the read-out gains of the two photoelectric read-out means may become equal to said predetermined value.

19. A method as defined in claim 17 wherein the two image signals are obtained by exposing the front surface of the stimulable phosphor sheet to the stimulating rays, which have been produced by one of two stimulating ray sources, and exposing the back surface of the stimulable phosphor sheet to the stimulating rays, which have been produced by the other stimulating ray source, and
  the compensation for a change of the addition ratio with the passage of time is carried out by correcting the output power of each of the two stimulating ray sources.

20. A radiation image read-out method comprising the steps of:
  i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
  ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and
  iii) adding the two image signals to each other in a predetermined addition ratio, an addition image signal, which represents the radiation image, being thereby obtained, wherein the improvement comprises the steps of:
  a) calculating a representative value of each of the two image signals, two representative values being thereby obtained,
  b) calculating the ratio between said two representative values, and
  c) detecting whether said ratio between said two representative values falls or does not fall within a predetermined range.

21. A radiation image read-out apparatus comprising:
  i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation,
  ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and
  iii) a means for adding the two image signals to each other in a predetermined addition ratio, an addition image signal, which represents the radiation image, being thereby obtained, wherein the improvement comprises the provision of:
  a) a representative value calculating means for calculating a representative value of each of the two image signals, two representative values being thereby obtained,
  b) a ratio calculating means for calculating the ratio between said two representative values,
  c) a comparison means for comparing said ratio between said two representative values with a reference value, and
  d) a compensation means for compensating for a change of the addition ratio with the passage of time in accordance with the results of the comparison.

22. An apparatus as defined in claim 21 wherein the read-out gain of each of the two photoelectric read-out means has been set such that the ratio between the read-out gains of the two photoelectric read-out means may be equal to a predetermined value, and said compensation means carries out the compensation for a change of the addition ratio with the passage of time, which change is due to a change of the read-out gains after they have been set in the two photoelectric read-out means, by correcting the read-out gain in each of the two photoelectric read-out means such that the ratio between the read-out gains of the two photoelectric read-out means may become equal to said predetermined value.

23. An apparatus as defined in claim 21 wherein two stimulating ray sources are located as said stimulating ray source such that one of said two stimulating ray sources may irradiate the stimulating rays to the front surface of the stimulable phosphor sheet, and such that the other stimulating ray source may irradiate the stimulating rays to the back surface of the stimulable phosphor sheet, and said compensation means carries out the compensation for a change of the addition ratio with the passage of time by correcting the output power of each of the two stimulating ray sources.

24. A radiation image read-out apparatus comprising:

i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and iii) a means for adding the two image signals to each other in a predetermined addition ratio, an addition image signal, which represents the radiation image, being thereby obtained, wherein the improvement comprises the provision of:
a) a representative value calculating means for calculating a representative value of each of the two image signals, two representative values being thereby obtained,
b) a ratio calculating means for calculating the ratio between said two representative values, and
c) a detection means for detecting whether said ratio between said two representative values falls or does not fall within a predetermined range.

25. A radiation image read-out method comprising the steps of:

i) exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) photoelectrically detecting the light, which is emitted from the front surface of the stimulable phosphor sheet, and the light, which is emitted from the back surface of the stimulable phosphor sheet, respectively with two photoelectric read-out means, two image signals being thereby obtained, and iii) adding the two image signals to each other in a predetermined addition ratio, an addition image signal, which represents the radiation image, being thereby obtained, wherein the improvement comprises the steps of:
a) calculating a representative value of each of the two image signals, two representative values being thereby obtained,
b) calculating the ratio between said two representative values,
c) comparing said ratio between said two representative values with a reference value, and
d) feeding out information representing the results of the comparison.

26. A radiation image read-out apparatus comprising:

i) a means for exposing a stimulable phosphor sheet, on which a radiation image has been stored, to stimulating rays, which have been produced by a stimulating ray source and cause the stimulable phosphor sheet to emit light in proportion to the amount of energy stored thereon during its exposure to radiation, ii) two photoelectric read-out means for respectively photoelectrically detecting the light, which is emitted from the front surface of the stimulable phosphor sheet, and the light, which is emitted from the back surface of the stimulable phosphor sheet, two image signals being thereby obtained, and iii) a means for adding the two image signals to each other in a predetermined addition ratio, an addition image signal, which represents the radiation image, being thereby obtained, wherein the improvement comprises the provision of:
a) a representative value calculating means for calculating a representative value of each of the two image signals, two representative values being thereby obtained,
b) a ratio calculating means for calculating the ratio between said two representative values,
c) a comparison means for comparing said ratio between said two representative values with a reference value, and
d) an output means for feeding out information representing the results of the comparison carried out by said comparison means.

* * * * *